(12) United States Patent
Guo et al.

(10) Patent No.: US 12,488,612 B2
(45) Date of Patent: Dec. 2, 2025

(54) METHOD FOR IDENTIFYING HUMAN POSES IN AN IMAGE, COMPUTER SYSTEM, AND NON-TRANSITORY COMPUTER-READABLE MEDIUM

(71) Applicant: INNOPEAK TECHNOLOGY, INC., Palo Alto, CA (US)

(72) Inventors: Yuliang Guo, Carmel, IN (US); Zhong Li, Santa Clara, CA (US); Xiangyu Du, Redwood City, CA (US); Yi Xu, Palo Alto, CA (US); Shuxue Quan, San Diego, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 439 days.

(21) Appl. No.: 18/559,082

(22) PCT Filed: Dec. 14, 2020

(86) PCT No.: PCT/US2020/064921
§ 371 (c)(1),
(2) Date: Nov. 6, 2023

(87) PCT Pub. No.: WO2021/092600
PCT Pub. Date: May 14, 2021

(65) Prior Publication Data
US 2024/0203152 A1  Jun. 20, 2024

(51) Int. Cl.
*G06K 9/00* (2022.01)
*G06T 7/11* (2017.01)
(Continued)

(52) U.S. Cl.
CPC ............... *G06V 40/10* (2022.01); *G06T 7/11* (2017.01); *G06T 7/50* (2017.01); *G06T 7/73* (2017.01);
(Continued)

(58) Field of Classification Search
CPC . G06T 2207/10024; G06T 2207/10028; G06T 2207/20081; G06T 2207/20084;
(Continued)

(56) References Cited

U.S. PATENT DOCUMENTS 10,380,753 B1 * 8/2019 Csordás ............... G06N 3/0895
11,468,698 B1 * 10/2022 Kim ........................ G06V 10/82
(Continued)

OTHER PUBLICATIONS

Cao, Zhe, et al. "Openpose: Realtime multi-person 2d pose estimation using part affinity fields." IEEE transactions on pattern analysis and machine intelligence 43.1 (2019): 172-186. (Year: 2019).*
(Continued)

*Primary Examiner* — Hadi Akhavannik
(74) *Attorney, Agent, or Firm* — Ladas & Parry, LLP

(57) ABSTRACT

A method for identifying human poses in an image, a computer system, and a non-transitory computer-readable medium are provided. The method includes obtaining the image, encoding the image into a feature map, converting the feature map into a plurality of TPDF maps corresponding to a plurality of predefined part types, and generating a global pose map based on the feature map and the plurality of TPDF maps corresponding to the predefined part types. Each TPDF map corresponds to a respective predefined part type and represents a plurality of vectors connecting each position on the image to a closest body part among the one or more body parts of the respective predefined part type. A global pose map is generated based on the feature map and the plurality of TPDF maps, identifying one or more human bodies having a plurality of body parts in a scene of the image.

20 Claims, 17 Drawing Sheets

(51) Int. Cl.
*G06T 7/50* (2017.01)
*G06T 7/73* (2017.01)
*G06V 10/77* (2022.01)
*G06V 10/82* (2022.01)
*G06V 40/10* (2022.01)

(52) U.S. Cl.
CPC .......... *G06V 10/7715* (2022.01); *G06V 10/82* (2022.01); *G06T 2207/10024* (2013.01); *G06T 2207/10028* (2013.01); *G06T 2207/20081* (2013.01); *G06T 2207/20084* (2013.01); *G06T 2207/30196* (2013.01)

(58) Field of Classification Search
CPC ... G06T 2207/30196; G06T 7/11; G06T 7/50; G06T 7/73; G06V 10/7715; G06V 10/82; G06V 20/647; G06V 40/10
See application file for complete search history.

(56) References Cited

U.S. PATENT DOCUMENTS

| | | | |
|---|---|---|---|
| 2006/0045366 A1 | 3/2006 | Chefd'hotel | |
| 2008/0187222 A1 | 8/2008 | Ernst et al. | |
| 2009/0190809 A1 | 7/2009 | Han et al. | |
| 2015/0287173 A1* | 10/2015 | Gluck | G06T 7/215 382/197 |
| 2017/0216718 A1* | 8/2017 | Polzin | A63F 13/215 |
| 2019/0051057 A1* | 2/2019 | Sommerlade | G06N 3/09 |
| 2019/0318511 A1 | 10/2019 | Ye | |
| 2019/0374190 A1* | 12/2019 | Kiely | A61B 5/091 |
| 2020/0202620 A1* | 6/2020 | Kiely | A61B 6/486 |
| 2020/0410669 A1* | 12/2020 | Psota | G06T 7/0012 |
| 2022/0354586 A1* | 11/2022 | Kaouk | G06T 7/0014 |
| 2023/0092387 A1* | 3/2023 | Psota | G06V 40/10 382/100 |

OTHER PUBLICATIONS

Papandreou, George, et al. "Personlab: Person pose estimation and instance segmentation with a bottom-up, part-based, geometric embedding model." Proceedings of the European conference on computer vision (ECCV). 2018. (Year: 2018).*

Yuliang Guo et al., 'PoP-Net: Pose over Parts Network for Multi-Person 3D Pose Estimation from a Depth Image', arXiv:2012.06734, pp. 1-12,Dec. 12, 2020 [retrieved on Aug. 13, 2021]. Retrieved from <URL: https://arxiv.org/abs/2012.06734 >; pp. 3-4,8.

International Search Report, International Application No. PCT/US2020/064921, mailed Sep. 3, 2021.

Written Opinion of the International Searching Authority in International Application No. PCT/US2020/064921, mailed Sep. 3, 2021.

International Preliminary Report on Patentability in International Application No. PCT/US2020/064921, issued on Jun. 13, 2023.

* cited by examiner

METHOD FOR IDENTIFYING HUMAN POSES IN AN IMAGE, COMPUTER SYSTEM, AND NON-TRANSITORY COMPUTER-READABLE MEDIUM

CROSS-REFERENCE TO RELATED APPLICATION

The present application is a 35 U.S.C. 371 National Phase application of PCT Application No. PCT/US2020/064921 filed Dec. 14, 2020, the disclosure of which is incorporated herein by reference in its entirety.

TECHNICAL FIELD

This application relates generally to data processing technology including, but not limited to, methods, systems, and non-transitory computer-readable media for predicting multi-person 2D or 3D poses in images using Truncated Part Displacement Field (TPDF) maps that correspond to a plurality of predefined body part types, and in particular to a method for identifying human poses in an image, a computer system, and a non-transitory computer-readable medium.

BACKGROUND

Human pose estimation plays an important role in a wide variety of applications (e.g., video surveillance, augmented reality, robot training, and interactive gaming). Existing human pose estimation methods oftentimes rely on a single image to predict human poses and can be differentiated by inputs (e.g., RGB images, depth images). These existing methods are capable of predicting multiple poses of multiple persons or a pose of a single person from the single image. The predicted poses are optionally two-dimensional (2D) or three-dimensional (3D).

Deep neural networks (DNN) have been used for multi-person pose estimation. For example, a single shot object detector is directly extended with additional pose attributes, so that a DNN can output information of human poses. Such single-shot-based pose estimation is efficient, and however, has a low part accuracy because a long-range inference for part locations is involved via a center-relative pose representation. Alternatively, object bounding boxes are detected and used to estimate poses via a two-stage pipeline. This two-stage pipeline is less efficient when multiple persons appear in an image, and a compatibility issue exists between pose estimation and bounding box detection. Next, human poses can be detected from part association. Although part detection can be rather efficient, solving a part association problem is usually time consuming, does not infer poses in a global sense, and can be sensitive to occlusion, truncation, and ambiguities in symmetric limbs. Moreover, many existing DNN-based human pose estimation methods do not allow a global-pose network towards an end-to-end solution.

SUMMARY

This application is directed to methods, systems, and non-transitory computer-readable media for predicting multi-person 2D or 3D poses from an image (e.g., an RGB or depth image). A pose estimation network is trained to learn to predict bottom-up part detection maps and top-down global poses in a single-shot framework. A fusion process is applied to fuse the global poses and part maps. Specifically, a part-level representation, called Truncated Part Displacement Field (TPDF) maps, is introduced. The TPDF maps drag global poses towards more accurate part locations while having a capability of handling occlusion and truncation. A mode selection scheme is developed to automatically resolve the conflict between global poses and local part detection.

In one aspect, a method is implemented at a computer system for identifying human poses in an image. The method includes obtaining the image, encoding the image into a feature map, and converting the feature map into a plurality of TPDF maps corresponding to a plurality of predefined part types. Each TPDF map corresponds to a respective predefined part type, and the image includes one or more body parts of the respective predefined part type. Each TPDF map includes an x-axis displacement map and a y-axis displacement map, and represents a plurality of vectors connecting each position on the image to a closest body part among the one or more body parts of the respective predefined part type. Each of the plurality of vectors is marked active when a magnitude of a respective vector is below a predefined vector truncating threshold. The method further includes generating a global pose map based on the feature map and the plurality of TPDF maps corresponding to the predefined part types. The global pose map is configured to identify one or more human bodies having a plurality of body parts in a scene of the image.

In another aspect, some implementations include a computer system including one or more processors and memory having instructions stored thereon, which when executed by the one or more processors cause the processors to perform the above methods.

In yet another aspect, some implementations include a non-transitory computer-readable medium, having instructions stored thereon, which when executed by one or more processors cause the processors to perform the above methods.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

A set of coordinates can be connected to describe a pose of a person with a human pose skeleton, and the skeleton represents an orientation of the person in a graphical format. Each coordinate in the skeleton is known as a body part (i.e., a joint, a keypoint), and a valid connection between two parts forms a pair (i.e., a limb). A total number, locations, and orientations of people are determined in multi-person pose estimation that is implemented in a top-down or bottom-up approach. That said, people are detected before individual parts and poses are estimated in the top-down approach, and parts of each person are detected before the detected parts are associated and grouped to people in the bottom-up approach. In some embodiments of this application, a Pose-over-Parts Network (PoP-Net) is applied to estimate multiple 2D or 3D poses from a depth image, e.g., by explicitly fusing parts and global poses that are predicted using the bottom-up and the top-down approaches, respectively.

Specifically, in some embodiments, a one-shot network is used to predict part-level representations and global poses, allowing positional-precise part detection and structurally valid global poses to be fused in an explicit way. This fusion process is enabled by an intermediate representation called Truncated-Part-Displacement-Field (TPDF) maps. Each TPDF includes a vector field that records vectors pointing to the closest part location at every 2D position of an image. The TPDF maps are utilized to drag a structural valid global pose towards more position-precise part detection, such that advantages from global pose and local part detection can be naturally unified. In some embodiments, a depth dataset is created to cover some aspects of visual variance related to 3D human pose estimation. The dataset facilitates training models that can be generalized to new background and unobserved multi-person configurations in real-world applications. By these means, an efficient framework is created to predict multiple 2D or 3D poses in one shot, thereby enabling an explicit fusion of global poses and part-level representations via a part-level TPDF representation and allowing a mode selection scheme to resolve conflicts between local and global predictions automatically.

Figure 1:
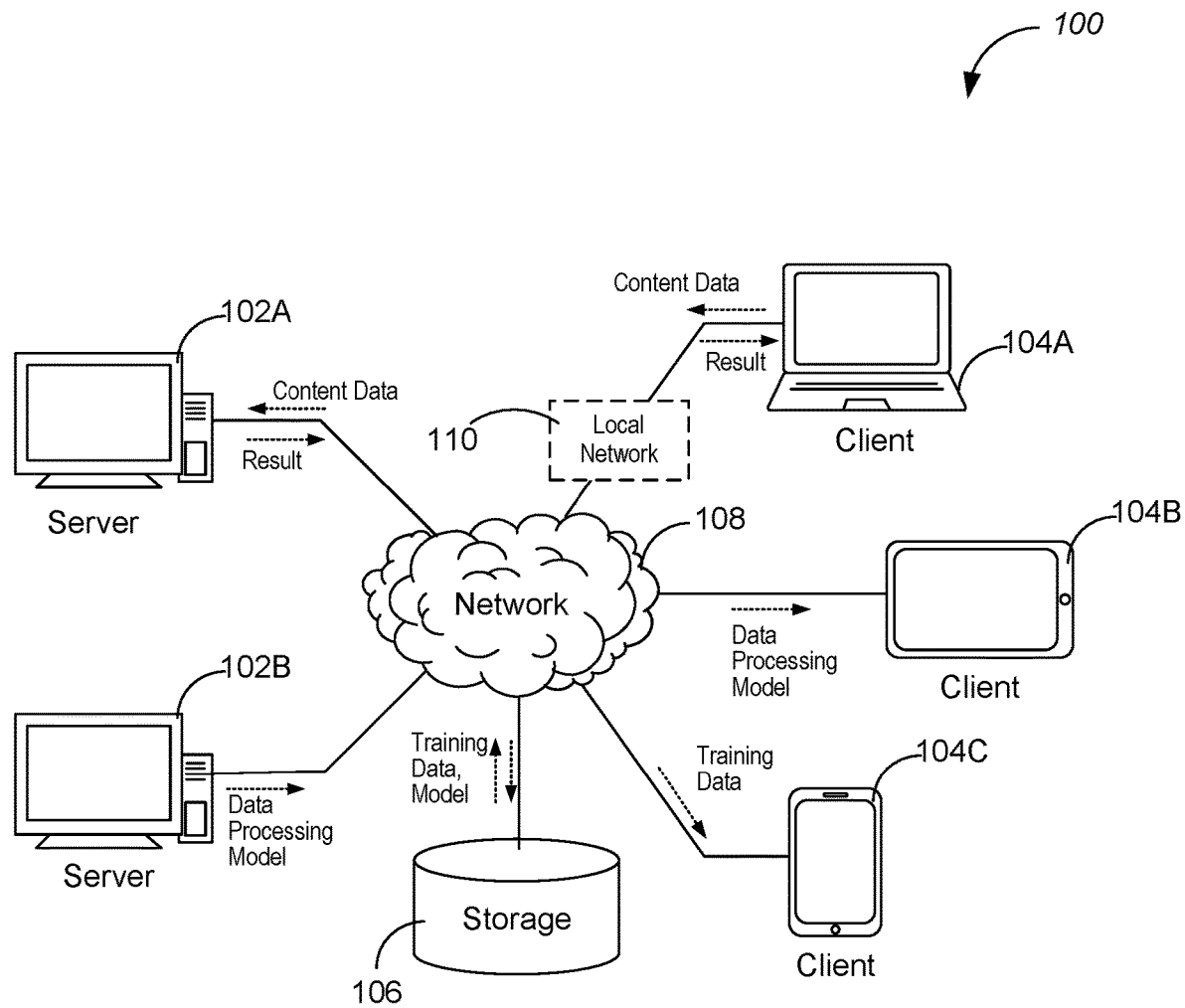
FIG. 1 is an example data processing environment having one or more servers communicatively coupled to one or more client devices, in accordance with some embodiments.

FIG. 1 is an example data processing environment 100 having one or more servers 102 communicatively coupled to one or more client devices 104, in accordance with some embodiments. The one or more client devices 104 may be, for example, desktop computers 104A, tablet computers 104B, mobile phones 104C, or intelligent, multi-sensing, network-connected home devices (e.g., a camera). Each client device 104 can collect data or user inputs, executes user applications, and present outputs on its user interface. The collected data or user inputs can be processed locally at the client device 104 and/or remotely by the server(s) 102. The one or more servers 102 provides system data (e.g., boot files, operating system images, and user applications) to the client devices 104, and in some embodiments, processes the data and user inputs received from the client device(s) 104 when the user applications are executed on the client devices 104. In some embodiments, the data processing environment 100 further includes a storage 106 for storing data related to the servers 102, client devices 104, and applications executed on the client devices 104.

The one or more servers 102 can enable real-time data communication with the client devices 104 that are remote from each other or from the one or more servers 102, and implement some data processing tasks that cannot be or are preferably not completed locally by the client devices 104. For example, the client devices 104 include a game console that executes an interactive online gaming application. The game console receives a user instruction and sends it to a game server 102 with user data. The game server 102 generates a stream of video data based on the user instruction and user data and providing the stream of video data for display on the game console and other client devices that are engaged in the same game session with the game console. In another example, the client devices 104 include a networked surveillance camera and a mobile phone 104C. The networked surveillance camera collects video data and streams the video data to a surveillance camera server 102 in real time. While the video data is optionally pre-processed on the surveillance camera, the surveillance camera server 102 processes the video data to identify motion or audio events in the video data and share information of these events with the mobile phone 104C, thereby allowing a user of the mobile phone 104 to monitor the events occurring near the networked surveillance camera in the real time and remotely.

The one or more servers 102, one or more client devices 104, and storage 106 are communicatively coupled to each other via one or more communication networks 108, which are the medium used to provide communications links between these devices and computers connected together within the data processing environment 100. The one or more communication networks 108 may include connections, such as wire, wireless communication links, or fiber optic cables. Examples of the one or more communication networks 108 include local area networks (LAN), wide area networks (WAN) such as the Internet, or a combination thereof. The one or more communication networks 108 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol. A connection to the one or more communication networks 108 may be established either directly (e.g., using 3G/4G connectivity to a wireless carrier), or through a network interface 110 (e.g., a router, switch, gateway, hub, or an intelligent, dedicated whole-home control node), or through any combination thereof. As such, the one or more communication networks 108 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages.

Deep learning techniques are applied in the data processing environment 100 to process content data (e.g., video, image, audio, or textual data) obtained by an application executed at a client device 104 to identify information contained in the content data, match the content data with other data, categorize the content data, or synthesize related content data. In these deep learning techniques, data processing models are created based on one or more neural networks to process the content data. These data processing models are trained with training data before they are applied to process the content data. In some embodiments, both model training and data processing are implemented locally at each individual client device 104 (e.g., the client device 104C). The client device 104C obtains the training data from the one or more servers 102 or storage 106 and applies the training data to train the data processing models. Subsequently to model training, the client device 104C obtains the content data (e.g., captures video data via an internal camera) and processes the content data using the training data processing models locally. Alternatively, in some embodiments, both model training and data processing are implemented remotely at a server 102 (e.g., the server 102A) associated with a client device 104 (e.g. the client device 104A). The server 102A obtains the training data from itself, another server 102 or the storage 106 and applies the training data to train the data processing models. The client device 104A obtains the content data, sends the content data to the server 102A (e.g., in an application) for data processing using the trained data processing models, receives data processing results from the server 102A, and presents the results on a user interface (e.g., associated with the application). The client device 104A itself implements no or little data processing on the content data prior to sending them to the server 102A. Additionally, in some embodiments, data processing is implemented locally at a client device 104 (e.g., the client device 104B), while model training is implemented remotely at a server 102 (e.g., the server 102B) associated with the client device 104B. The server 102B obtains the training data from itself, another server 102 or the storage 106 and applies the training data to train the data processing models. The trained data processing models are optionally stored in the server 102B or storage 106. The client device 104B imports the trained data processing models from the server 102B or storage 106, processes the content data using the data processing models, and generates data processing results to be presented on a user interface locally.

Figure 2:
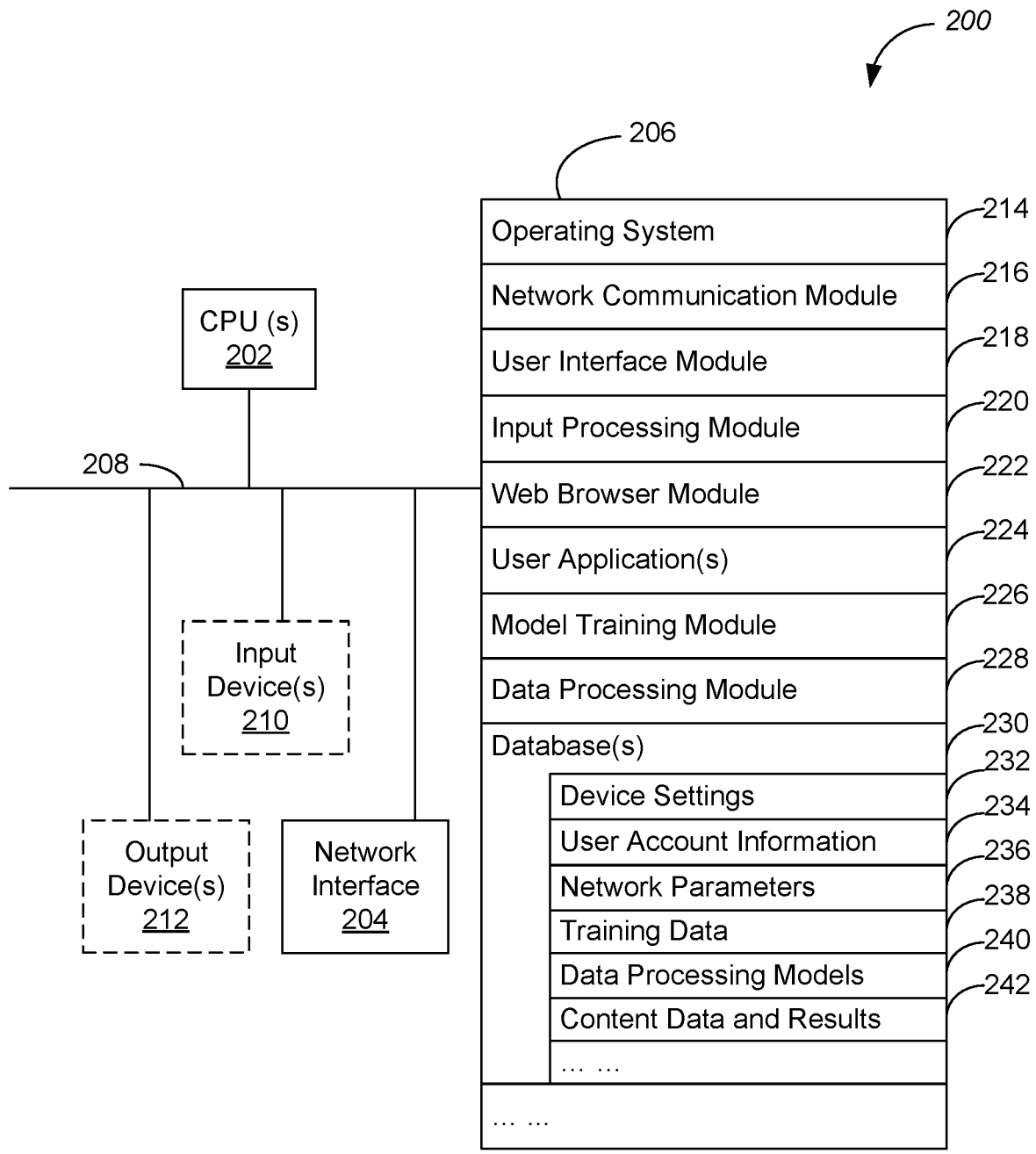
FIG. 2 is a block diagram illustrating a data processing system, in accordance with some embodiments.

FIG. 2 is a block diagram illustrating a data processing system 200, in accordance with some embodiments. The data processing system 200 includes a server 102, a client device 104, a storage 106, or a combination thereof. The data processing system 200, typically, includes one or more processing units (CPUs) 202, one or more network interfaces 204, memory 206, and one or more communication buses 208 for interconnecting these components (sometimes called a chipset). The data processing system 200 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, in some embodiments, the client device 104 of the data processing system 200 uses a microphone and voice recognition or a camera and gesture recognition to supplement or replace the key board. In some embodiments, the client device 104 includes one or more cameras, scanners, or photo sensor units for capturing images, for example, of graphic serial codes printed on the electronic devices. The data processing system 200 also includes one or more output devices 212 that enable presentation of user interfaces and display content, including one or more speakers and/or one or more visual displays. Optionally, the client device 104 includes a location detection device, such as a GPS (global positioning satellite) or other geo-location receiver, for determining the location of the client device 104.

Memory 206 includes high-speed random access memory, such as DRAM, SRAM, DDR RAM, or other random access solid state memory devices: and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some embodiments, memory 206, or the non-transitory computer readable storage medium of memory 206, stores the following programs, modules, and data structures, or a subset or superset thereof:

- Operating system 214 including procedures for handling various basic system services and for performing hardware dependent tasks;
- Network communication module 216 for connecting each server 102 or client device 104 to other devices (e.g., server 102, client device 104, or storage 106) via one or more network interfaces 204 (wired or wireless) and one or more communication networks 108, such as the Internet, other wide area networks, local area networks, metropolitan area networks, and so on;
- User interface module 218 for enabling presentation of information (e.g., a graphical user interface for application(s) 224, widgets, websites and web pages thereof, and/or games, audio and/or video content, text, etc.) at each client device 104 via one or more output devices 212 (e.g., displays, speakers, etc.);
- Input processing module 220 for detecting one or more user inputs or interactions from one of the one or more input devices 210 and interpreting the detected input or interaction;
- Web browser module 222 for navigating, requesting (e.g., via HTTP), and displaying websites and web pages thereof, including a web interface for logging into a user account associated with a client device 104 or another electronic device, controlling the client or electronic device if associated with the user account, and editing and reviewing settings and data that are associated with the user account;

One or more user applications 224 for execution by the data processing system 200 (e.g., games, social network applications, smart home applications, and/or other web or non-web based applications for controlling another electronic device and reviewing data captured by such devices);

Model training module 226 for receiving training data and establishing a data processing model for processing content data (e.g., video, image, audio, or textual data) to be collected or obtained by a client device 104;

Data processing module 228 for processing content data using data processing models 240, thereby identifying information contained in the content data, matching the content data with other data, categorizing the content data, or synthesizing related content data, where in some embodiments, the data processing module 228 is associated with one of the user applications 224 to process the content data in response to a user instruction received from the user application 224;

One or more databases 230 for storing at least data including one or more of:

Device settings 232 including common device settings (e.g., service tier, device model, storage capacity, processing capabilities, communication capabilities, etc.) of the one or more servers 102 or client devices 104;

User account information 234 for the one or more user applications 224, e.g., user names, security questions, account history data, user preferences, and predefined account settings;

Network parameters 236 for the one or more communication networks 108, e.g., IP address, subnet mask, default gateway, DNS server and host name;

Training data 238 for training one or more data processing models 240;

Data processing model(s) 240 for processing content data (e.g., video, image, audio, or textual data) using deep learning techniques: and Content data and results 242 that are obtained by and outputted to the client device 104 of the data processing system 200, respectively, where the content data is processed by the data processing models 240 locally at the client device 104 or remotely at the server 102 to provide the associated results 242 to be presented on client device 104.

Optionally, the one or more databases 230 are stored in one of the server 102, client device 104, and storage 106 of the data processing system 200. Optionally, the one or more databases 230 are distributed in more than one of the server 102, client device 104, and storage 106 of the data processing system 200. In some embodiments, more than one copy of the above data is stored at distinct devices, e.g., two copies of the data processing models 240 are stored at the server 102 and storage 106, respectively.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 206, optionally, stores a subset of the modules and data structures identified above. Furthermore, memory 206, optionally, stores additional modules and data structures not described above.

Figure 3:
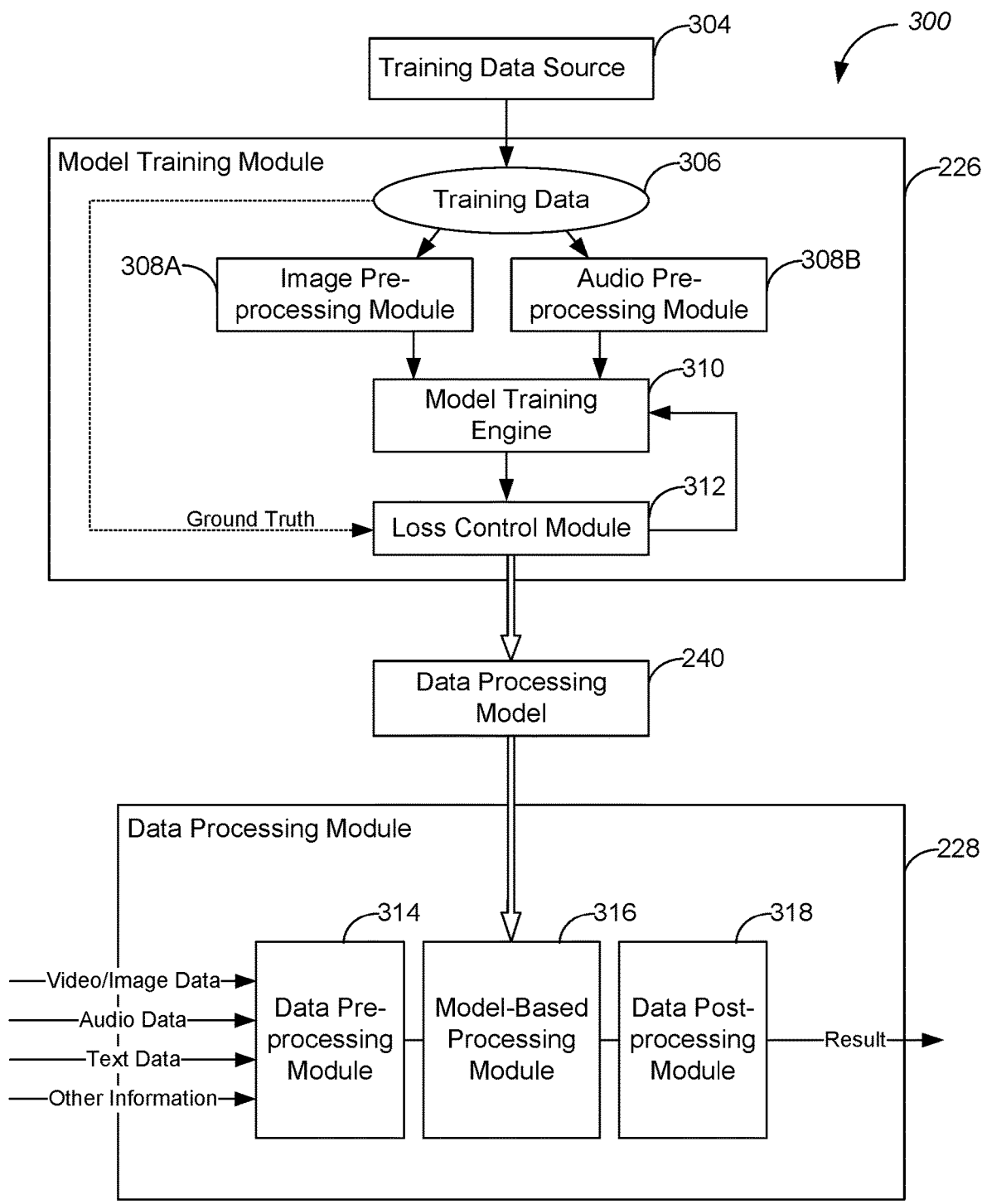
FIG. 3 is an example data processing environment for training and applying a neural network based (NN-based) data processing model for processing visual and/or audio data, in accordance with some embodiments.

FIG. 3 is another example data processing system 300 for training and applying a neural network based (NN-based) data processing model 240 for processing content data (e.g., video, image, audio, or textual data), in accordance with some embodiments. The data processing system 300 includes a model training module 226 for establishing the data processing model 240 and a data processing module 228 for processing the content data using the data processing model 240. In some embodiments, both of the model training module 226 and the data processing module 228 are located on a client device 104 of the data processing system 300, while a training data source 304 distinct form the client device 104 provides training data 306 to the client device 104. The training data source 304 is optionally a server 102 or storage 106. Alternatively, in some embodiments, both of the model training module 226 and the data processing module 228 are located on a server 102 of the data processing system 300. The training data source 304 providing the training data 306 is optionally the server 102 itself, another server 102, or the storage 106. Additionally, in some embodiments, the model training module 226 and the data processing module 228 are separately located on a server 102 and client device 104, and the server 102 provides the trained data processing model 240 to the client device 104.

The model training module 226 includes one or more data pre-processing modules 308, a model training engine 310, and a loss control module 312. The data processing model 240 is trained according to a type of the content data to be processed. The training data 306 is consistent with the type of the content data, so is a data pre-processing module 308 applied to process the training data 306 consistent with the type of the content data. For example, an image pre-processing module 308A is configured to process image training data 306 to a predefined image format, e.g., extract a region of interest (ROI) in each training image, and crop each training image to a predefined image size. Alternatively, an audio pre-processing module 308B is configured to process audio training data 306 to a predefined audio format, e.g., converting each training sequence to a frequency domain using a Fourier transform. The model training engine 310 receives pre-processed training data provided by the data pre-processing modules 308, further processes the pre-processed training data using an existing data processing model 240, and generates an output from each training data item. During this course, the loss control module 312 can monitor a loss function comparing the output associated with the respective training data item and a ground truth of the respective training data item. The model training engine 310 modifies the data processing model 240 to reduce the loss function, until the loss function satisfies a loss criteria (e.g., a comparison result of the loss function is minimized or reduced below a loss threshold). The modified data processing model 240 is provided to the data processing module 228 to process the content data.

In some embodiments, the model training module 226 offers supervised learning in which the training data is entirely labelled and includes a desired output for each training data item (also called the ground truth in some situations). Conversely, in some embodiments, the model training module 226 offers unsupervised learning in which the training data are not labelled. The model training module 226 is configured to identify previously undetected patterns in the training data without pre-existing labels and with no or little human supervision. Additionally, in some embodiments, the model training module 226 offers partially supervised learning in which the training data are partially labelled.

The data processing module 228 includes a data pre-processing modules 314, a model-based processing module 316, and a data post-processing module 318. The data pre-processing modules 314 pre-processes the content data based on the type of the content data. Functions of the data pre-processing modules 314 are consistent with those of the pre-processing modules 308 and covert the content data to a predefined content format that is acceptable by inputs of the model-based processing module 316. Examples of the content data include one or more of: video, image, audio, textual, and other types of data. For example, each image is pre-processed to extract an ROI or cropped to a predefined image size, and an audio clip is pre-processed to convert to a frequency domain using a Fourier transform. In some situations, the content data includes two or more types, e.g., video data and textual data. The model-based processing module 316 applies the trained data processing model 240 provided by the model training module 226 to process the pre-processed content data. The model-based processing module 316 can also monitor an error indicator to determine whether the content data has been properly processed in the data processing model 240). In some embodiments, the processed content data is further processed by the data post-processing module 318 to present the processed content data in a preferred format or to provide other related information that can be derived from the processed content data.

Figure 4A:
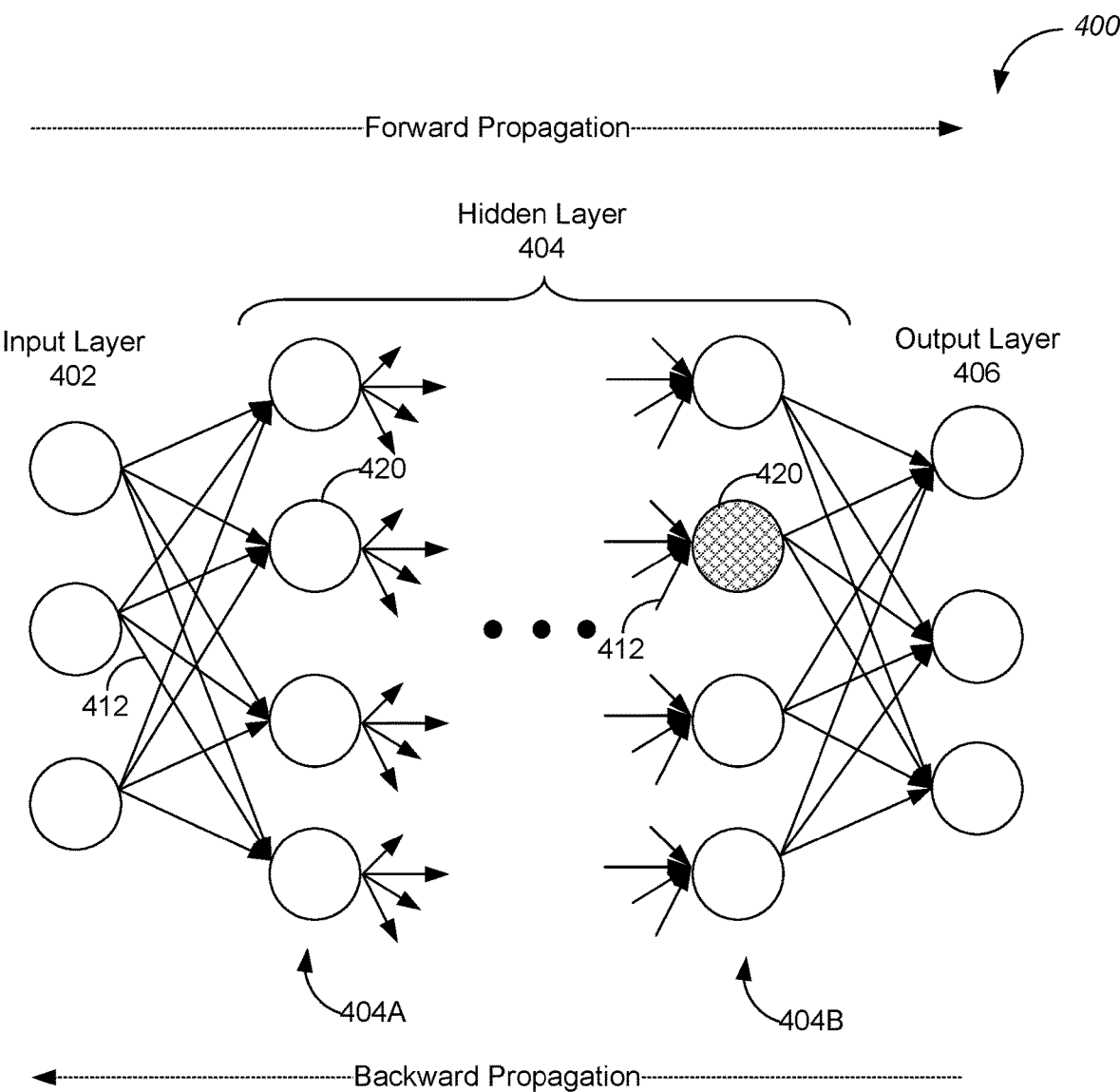
FIG. 4 is an example neural network applied to process part of visual or audio data in an NN-based data processing model, in accordance with some embodiments.
Figure 4B:
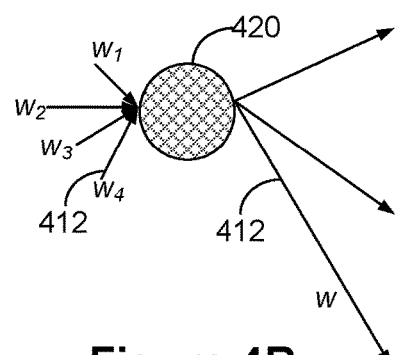

FIG. 4A is an example neural network (NN) 400 applied to process content data in an NN-based data processing model 240, in accordance with some embodiments, and FIG. 4B is an example node 420 in the neural network (NN) 400, in accordance with some embodiments. The data processing model 240) is established based on the neural network 400. A corresponding model-based processing module 316 applies the data processing model 240 including the neural network 400 to process content data that has been converted to a predefined content format. The neural network 400 includes a collection of nodes 420 that are connected by links 412. Each node 420 receives one or more node inputs and applies a propagation function to generate a node output from the one or more node inputs. As the node output is provided via one or more links 412 to one or more other nodes 420, a weight w associated with each link 412 is applied to the node output. Likewise, the one or more node inputs are combined based on corresponding weights $w_1$, $w_2$, $w_3$, and $w_4$ according to the propagation function. In an example, the propagation function is a product of a non-linear activation function and a linear weighted combination of the one or more node inputs.

The collection of nodes 420 is organized into one or more layers in the neural network 400. Optionally, the one or more layers includes a single layer acting as both an input layer and an output layer. Optionally, the one or more layers includes an input layer 402 for receiving inputs, an output layer 406 for providing outputs, and zero or more hidden layers 404 (e.g., 404A and 404B) between the input and output layers 402 and 406. A deep neural network has more than one hidden layers 404 between the input and output layers 402 and 406. In the neural network 400, each layer is only connected with its immediately preceding and/or immediately following layer. In some embodiments, a layer 402 or 404B is a fully connected layer because each node 420 in the layer 402 or 404B is connected to every node 420 in its immediately following layer. In some embodiments, one of the one or more hidden layers 404 includes two or more nodes that are connected to the same node in its immediately following layer for down sampling or pooling the nodes 420 between these two layers. Particularly, max pooling uses a maximum value of the two or more nodes in the layer 404B for generating the node of the immediately following layer 406 connected to the two or more nodes.

In some embodiments, a convolutional neural network (CNN) is applied in a data processing model 240 to process content data (particularly, video and image data). The CNN employs convolution operations and belongs to a class of deep neural networks 400, i.e., a feedforward neural network that only moves data forward from the input layer 402 through the hidden layers to the output layer 406. The one or more hidden layers of the CNN are convolutional layers convolving with a multiplication or dot product. Each node in a convolutional layer receives inputs from a receptive area associated with a previous layer (e.g., five nodes), and the receptive area is smaller than the entire previous layer and may vary based on a location of the convolution layer in the convolutional neural network. Video or image data is pre-processed to a predefined video/image format corresponding to the inputs of the CNN. The pre-processed video or image data is abstracted by each layer of the CNN to a respective feature map. By these means, video and image data can be processed by the CNN for video and image recognition, classification, analysis, imprinting, or synthesis.

Alternatively and additionally, in some embodiments, a recurrent neural network (RNN) is applied in the data processing model 240 to process content data (particularly, textual and audio data). Nodes in successive layers of the RNN follow a temporal sequence, such that the RNN exhibits a temporal dynamic behavior. In an example, each node 420 of the RNN has a time-varying real-valued activation. Examples of the RNN include, but are not limited to, a long short-term memory (LSTM) network, a fully recurrent network, an Elman network, a Jordan network, a Hopfield network, a bidirectional associative memory (BAM network), an echo state network, an independently RNN (IndRNN), a recursive neural network, and a neural history compressor. In some embodiments, the RNN can be used for handwriting or speech recognition. It is noted that in some embodiments, two or more types of content data are processed by the data processing module 228, and two or more types of neural networks (e.g., both CNN and RNN) are applied to process the content data jointly.

The training process is a process for calibrating all of the weights $w_t$ for each layer of the learning model using a training data set which is provided in the input layer 402. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured, and the weights are adjusted accordingly to decrease the error. The activation function is optionally linear, rectified linear unit, sigmoid, hyperbolic tangent, or of other types. In some embodiments, a network bias term b is added to the sum of the weighted outputs from the previous layer before the activation function is applied. The network bias b provides a perturbation that helps the NN 400 avoid over fitting the training data. The result of the training includes the network bias parameter b for each layer.

Figure 5A:
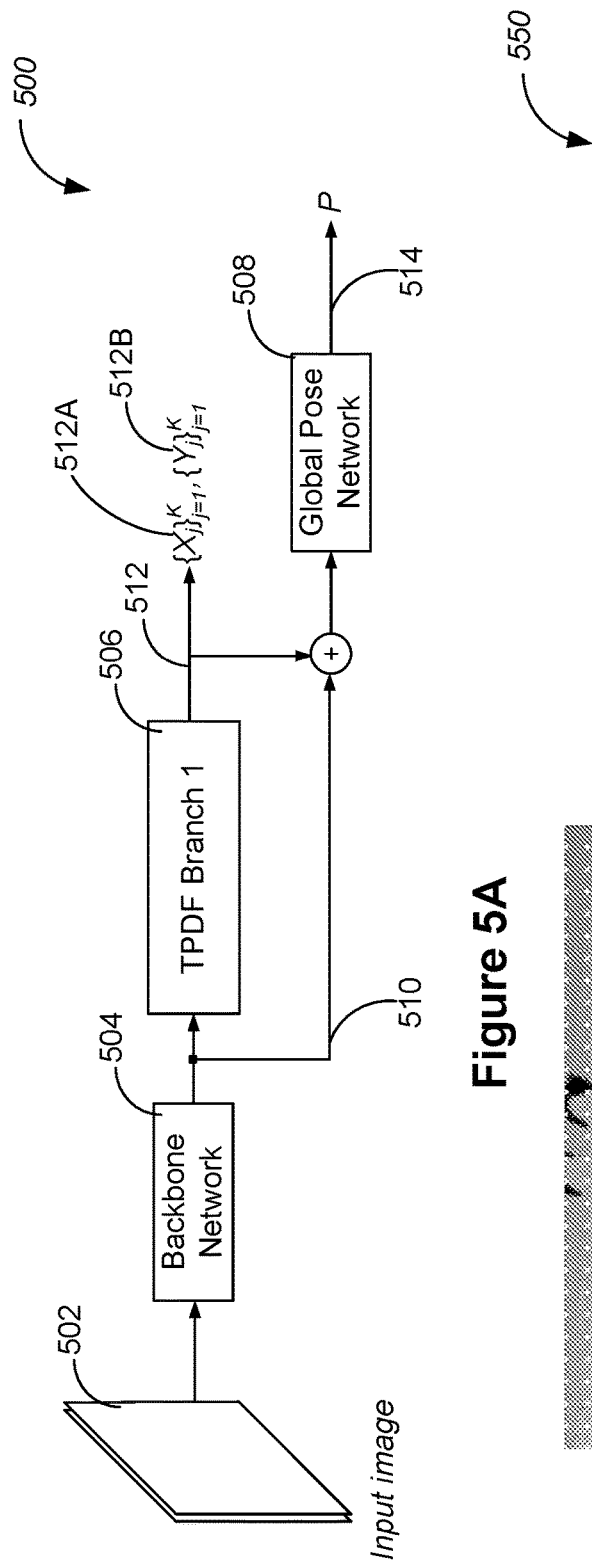
FIG. 5A is a block diagram of a data processing model for identifying human poses in an image based on TPDF maps, in accordance with some embodiments.
Figure 5B:
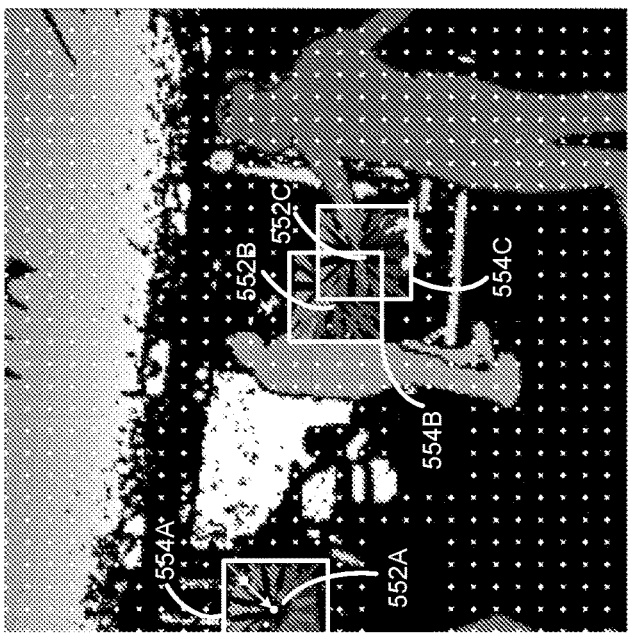
FIG. 5B is an example image including a set of vectors defined by a TPDF map, in accordance with some embodiments.

FIG. 5A is a block diagram of a data processing model 500 for identifying human poses in an image 502 based on TPDF maps, in accordance with some embodiments, and FIG. 5B is an example image 550 including a set of vectors defined by a TPDF map, in accordance with some embodiments. The data processing model 500 includes a backbone network 504, a first TPDF branch 506, and a global pose network 508. The backbone network 504 obtains the image 502 and encodes the image into a feature map 510. The image 502 includes at least one of an RGB image and a depth image. The first TPDF branch 506 converts the feature map 510 into a plurality of TPDF maps 512 corresponding to a plurality of predefined part types. Each TPDF map 512 corresponds to a respective predefined part type, and the image 502 includes one or more body parts of the respective predefined part type. Each TPDF map 512 includes an x-axis displacement map $\{X_j\}_{j=1}^K$ 512A and a y-axis displacement map $\{Y_j\}_{j=1}^K$ 512B, and represents a plurality of vectors connecting each position on the image 502 to a closest body part among the one or more body parts of the respective predefined part type. Each of the plurality of vectors is marked active when a magnitude of a respective vector is below a predefined vector truncating threshold. Stated another way, in each TPDF map 512, each vector is marked active when the vector starts within a truncated range of the closest body part, and the truncated range is defined by the predefined vector truncating threshold. The global pose network 508 generates a global pose map 514 based on the feature map 510 and the plurality of TPDF maps 512 corresponding to the predefined part types. The global pose map 514 is configured to identify one or more human bodies having a plurality of body parts in a scene of the image.

The TPDF maps 512 are a part-level representation of one or more human bodies in the image 502. In some embodiments, each human body includes K body parts each having a respective distinct part type j (j=1, 2, ..., K). For each part type j, a corresponding TPDF map 512 records a displacement vector pointing to the closest body part of the respective part type for each two-dimensional position in the image 502. Each TPDF map 512 encodes a displacement field involving one or more body parts of the same part type (e.g., two arms coming from different human bodies) in a single map and is effective in the truncated range as defined by the predefined vector truncating threshold, which thereby enables learning of convolutional kernels of the TPDF branch 506 in some embodiments. Referring to FIG. 5B, the image 550 includes three right hands 552A-552C of three human bodies. Each right hand 552 corresponds to a truncated range 554 as defined by the predefined vector truncating threshold. The displacement vectors (e.g., a vector 556) are non-zero for positions within the truncated ranges 554A-554C, and equal to zero for positions external to the truncated ranges 554A-554C. The right hands 552B and 552C are proximate to each other on the image 550, and their corresponding truncated ranges 554B and 554C overlap each other. Each position in an overlapped area of the truncated ranges 554B and 554C is closer to one of the right hands 552B and 552C, and therefore, corresponds to the displacement vector connecting the respective position to the one of the right hands 552B and 552C. For example, a position 558 in the overlapped area is closer to the right hand 552C, and its displacement vector connects the position 558 to the sright hand 552C.

In some embodiments, the backbone network 504 is implemented based on a RNN. e.g., includes layers 0-2 from ResNet-34. The feature map 510 has a dimension of w/8× h/8× 128, where h and w are a height and a width of the image 502, respectively. As such, in some embodiments, an 8× down sampling ratio is applied to make a part-level inference (e.g., for generating the TPDF maps 512). In some embodiments, the global pose network 508 is implemented using a CNN having a plurality of layers (e.g., four convolutional layers followed by a max pooling layer). In some embodiments, the data processing model 500 is trained end-to-end via minimizing a total loss $L_1$ that is a sum of a backbone loss $L_B$, a TPDF loss $L_h$, and a global pose loss $L_p$. The backbone loss $L_B$, TPDF loss $L_h$, and global pose loss $L_p$ are contributed by multiple stages (i.e., the backbone network 504, TPDF branch 506, and global pose network 508) of the data processing model 500.

Figure 6:
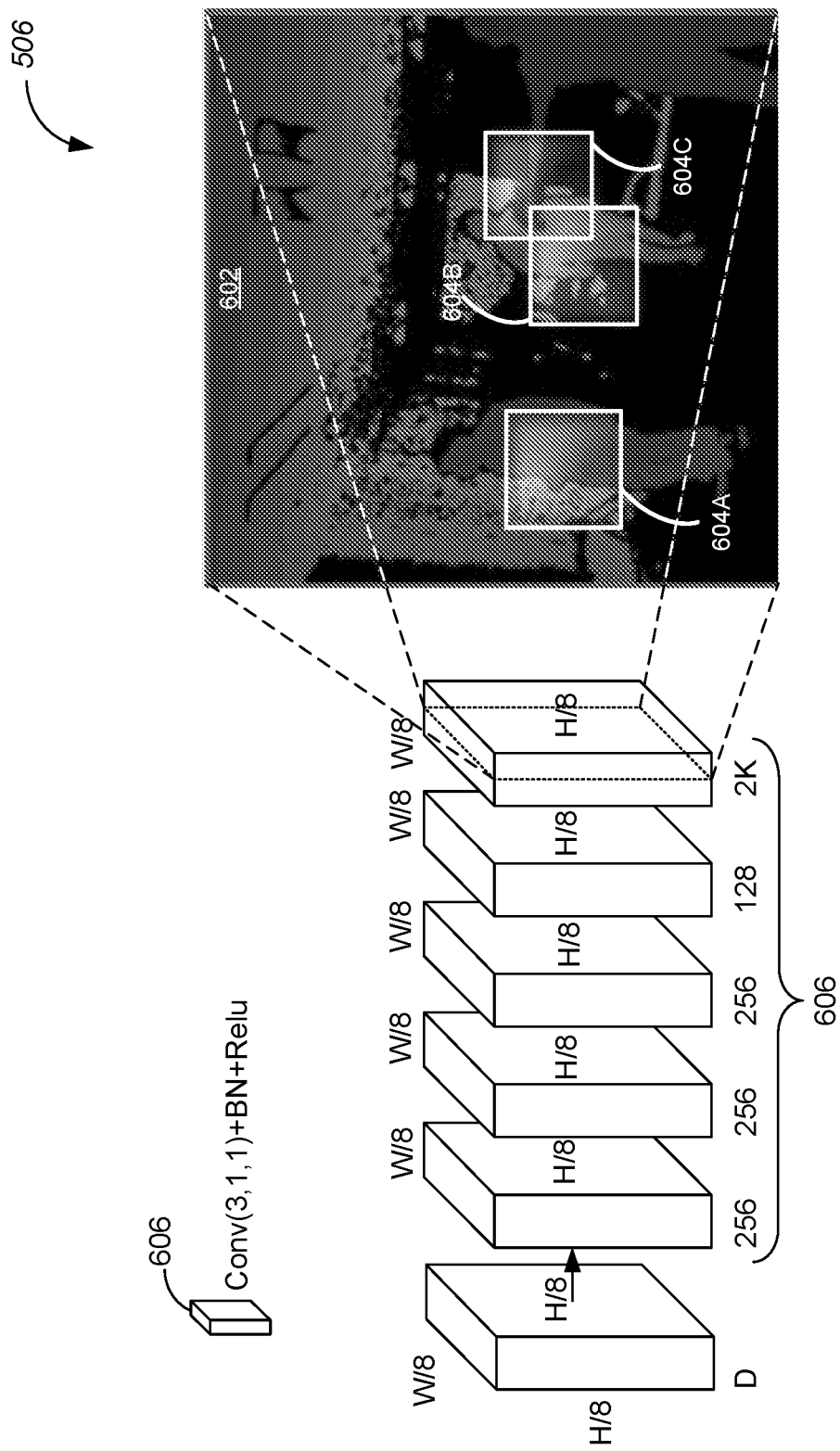
FIG. 6 illustrate a TPDF branch that predicts displacement vectors of TPDF maps, in accordance with some embodiments.

FIG. 6 illustrate a TPDF branch 506 that predicts displacement vectors of TPDF maps 512, in accordance with some embodiments. The displacement vectors are visualized on an image 602. In some embodiments, each human body includes K distinct body parts, and the TPDF branch 506 outputs 2K maps of displacement vectors corresponding to the K distinct body parts, including K x-axis displacement maps $\{X_j\}_{j=1}^K$ 512A and K y-axis displacement maps $\{Y_j\}_{j=1}^K$ 512B. The TPDF branch 506 includes a plurality of 3×3 convolutional layers 606 (e.g., 5 convolutional layers), and each convolutional layer 606 is followed by a batch normalization (BN) layer and a Rectified Linear Unit (ReLU).

During a training process, a ground truth is determined for each TPDF map 512 associated with a part type, and includes displacement vectors (i.e., x-axis and y-axis displacement maps $\{X_j\}_{j=1}^K$ and $\{Y_j\}_{j=1}^K$)). In the ground truth, a displacement vector at each 2D position of the image 602 points to the closest body part of the part type associated with the respective TPDF map 512. The displacement vectors are only non-zero within a truncated range 604 of each body part of the part type. For example, the image 602 includes three right arms of three human bodies, and each right harm corresponds to a respective one of the truncated ranges 604A, 604B, and 604C. In some embodiments, a weight map $\{W_j^t\}_{j=1}^K$ is applied, and weight elements of the weight map corresponding to the truncated ranges 604 are set to 1.0 and the remainder of the weight map is set to 0).

Learning of convolutional kernels (e.g., the convolutional layers 606) is based on the truncated ranges 604. If a full-range field is used, a pair of displacement vectors close to each other but far from any part may have a large Euclidean distance in between. In such cases, the learning of convolutional kernels will be confused by image patches similar in appearance but associated with drastically different ground-truth values. In contrast, the TPDF branch 506 is trained such that a body part from a global pose falls in the truncated ranges 604 of the corresponding part type. In some implementations, a conflict resolving scheme is applied jointly with the TPDF maps 512 when global prediction conflicts with part prediction due to occlusion. More details on these occlusion cases are discussed below with reference to FIG. 14.

Figure 7:
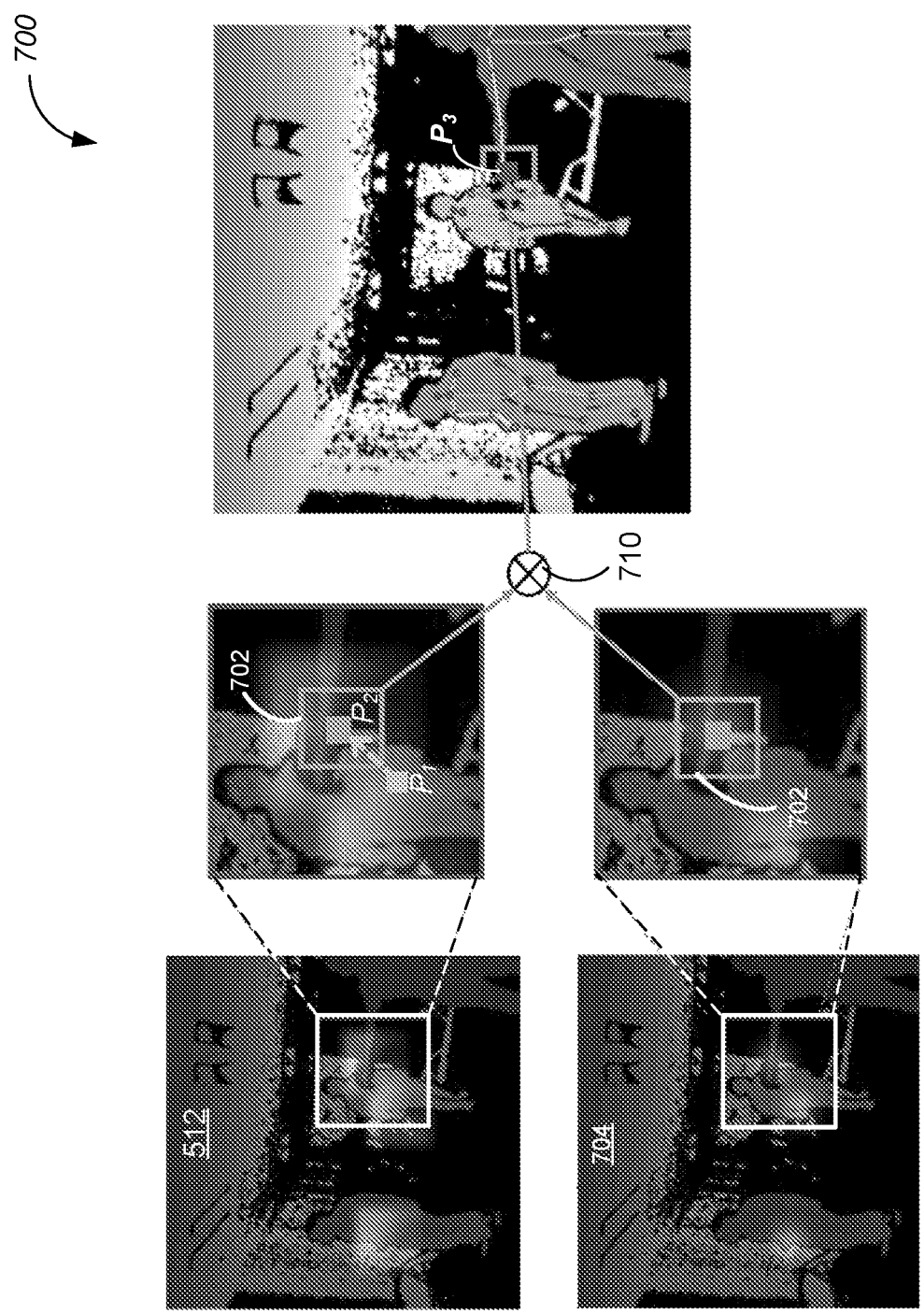
FIG. 7 illustrate a fusion process that determines a final position and a depth of each of a plurality of body parts in an image, in accordance with some embodiments.

FIG. 7 illustrate a fusion process 700 that determines a final position $(\hat{x}_j, \hat{y}_j)$ and a depth $2j$ of each of a plurality of body parts in an image, in accordance with some embodiments. Part representations and global poses are fused based on at least the TPDF maps 512. A 2D body part having a part type is predicted based on a global pose to be located at a first position $P_1 (x_j, y_j)$. The first position $P_1$ is modified to an updated position $P_2 (\bar{x}_j, \bar{y}_j)$ based on the displacement vectors $\{X_j\}$ and $\{Y_j\}$ of the TPDF map 512 corresponding to the part type. In an example, the second position $P_2$ is derived from the first position $P_1$ as follows:

$$\bar{x}_j = x_j + X_j(x_j, y_j); \text{ and } \bar{y}_j = y_j + Y_j(x_j, y_j). \quad (1)$$

In some embodiments, weighted aggregation 710 is applied to estimate the final position $P_3$ ($\hat{x}_j$, $\hat{y}_j$) and the depth $\hat{z}_j$ of each of the plurality of body parts in the image. A mask 702 is centered at the updated position $P_2$ ($\bar{x}_j$, $\bar{y}_j$). For each body part, each of the displacement vectors ($X_j$, $Y_j$) of the corresponding TPDF map 512 and a corresponding depth map $D_j$ is averaged in the mask 702 using a confidence map $H_j$ (i.e., a heat map) 704 as aggregation weights as follows:

$$\hat{x}_j = |\bar{x}_j| + \frac{\sum_{(u,v)\in M} H_j(u, v) \cdot X_j(u, v)}{\sum_{(u,v)\in M} H_j(u, v)} \quad (2)$$

$$\hat{y}_j = |\bar{y}_j| + \frac{\sum_{(u,v)\in M} H_j(u, v) \cdot Y_j(u, v)}{\sum_{(u,v)\in M} H_j(u, v)} \quad (3)$$

$$\hat{z}_j = \frac{\sum_{(u,v)\in M} H_j(u, v) \cdot D_j(u, v)}{\sum_{(u,v)\in M} H_j(u, v)} \quad (4)$$

where the final position $\{(\hat{x}_j, \hat{y}_j)\}_{j=1}^{K}$ and the depth $\{\hat{z}_j\}_{j=1}^{K}$ define a 3D position of the corresponding body part on the global pose map 514 (i.e., an output of the data processing model 500), and can be transformed to a physical position given known camera intrinsic parameters. By these means, the data processing model 500 fuses predicted bottom-up parts and top-down global poses and allows the TPDF branch 506 to drive a structurally valid global pose towards more position-precise part detection (e.g., from $P_1$ ($x_j$, $y_j$) to $P_2$ ($\bar{x}_j$, $\bar{y}_j$)), thereby unifying advantages from global pose and local part detection.

Figure 8:
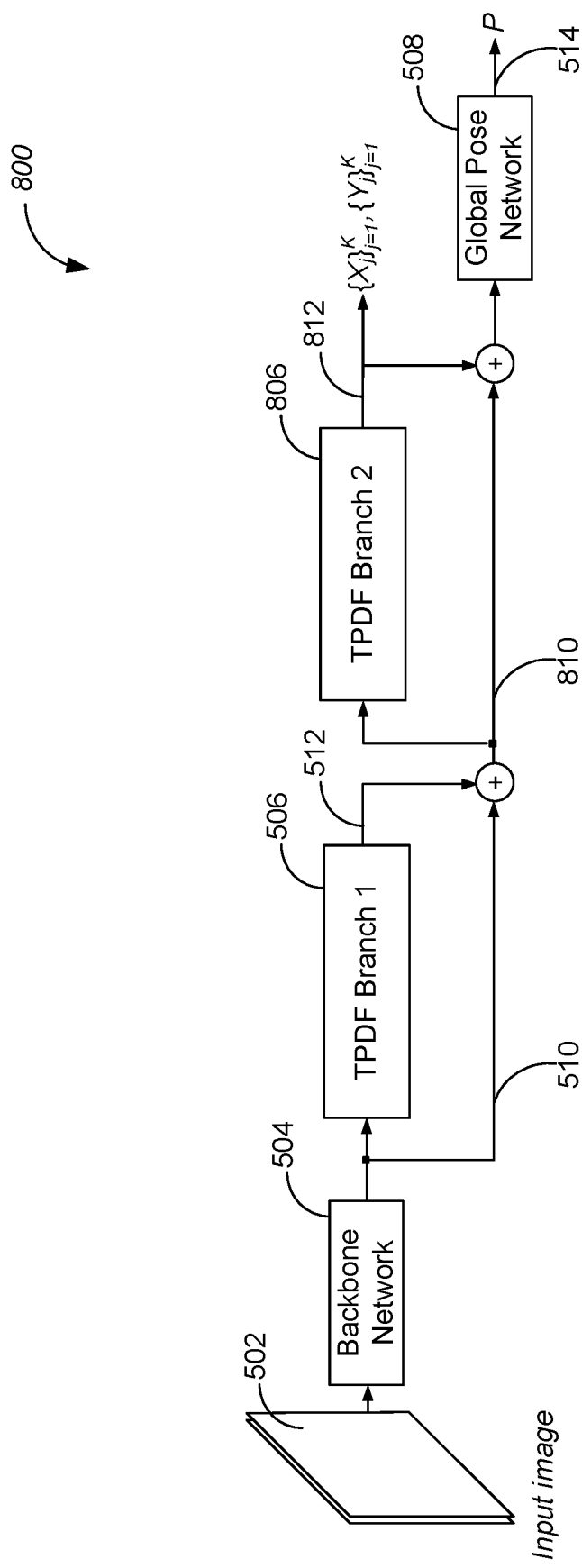
FIG. 8 is a block diagram of a two-stage data processing model for identifying human poses in an image based on TPDF maps, in accordance with some embodiments.

FIG. 8 is a block diagram of a two-stage data processing model 800 for identifying human poses in an image 502 based on TPDF maps, in accordance with some embodiments. The data processing model 800 includes a backbone network 504, a first TPDF branch 506, a second TPDF branch 806, and a global pose network 508. The backbone network 504 obtains the image and encodes the image into a feature map 510. The first TPDF branch 506 converts the feature map 510 into a plurality of first TPDF maps 512 corresponding to a plurality of predefined part types. The feature map 510 is combined (e.g., concatenated) with the plurality of first TPDF maps 512 to generate a combined feature map 810. The second TPDF branch 806 converts the combined feature map 810 to a plurality of second TPDF maps 812. The global pose network 508 generates a global pose map 514 based on the second feature map 810 and the plurality of second TPDF maps 812 corresponding to the predefined part types. The global pose map 814 identifies one or more human bodies having a plurality of body parts in a scene of the image 502.

In some embodiments, each second TPDF map 812 corresponds to a respective predefined part type, and the image 502 includes one or more body parts of the respective predefined part type. Each second TPDF map 812 includes a second x-axis displacement map $\{X_j\}_{j=1}^{K}$ 812A and a second y-axis displacement map $\{Y_j\}_{j=1}^{K}$ 812B, and represents a plurality of second vectors connecting each position on the image 502 to a closest body part among the one or more body parts of the respective predefined part type. Each of the plurality of second vectors is marked active when a magnitude of a respective second vector is below the predefined vector truncating threshold. Stated another way, in each TPDF map 812, each vector is marked active when the vector starts within a truncated range of the closest body part, and the truncated range is also defined by the predefined vector truncating threshold. The second TPDF branch 806 optionally includes a plurality of convolutional layers, and trained with a ground truth including displacement vectors and a weight map as described with reference to FIG. 6. In some embodiments, the TPDF branches 506 and 806 are applied jointly in the fusion process 700 to determine the position ($\hat{x}_j$, $\hat{y}_j$) and depth $\hat{z}_j$ of each of a plurality of body parts in an image.

Figure 9A:
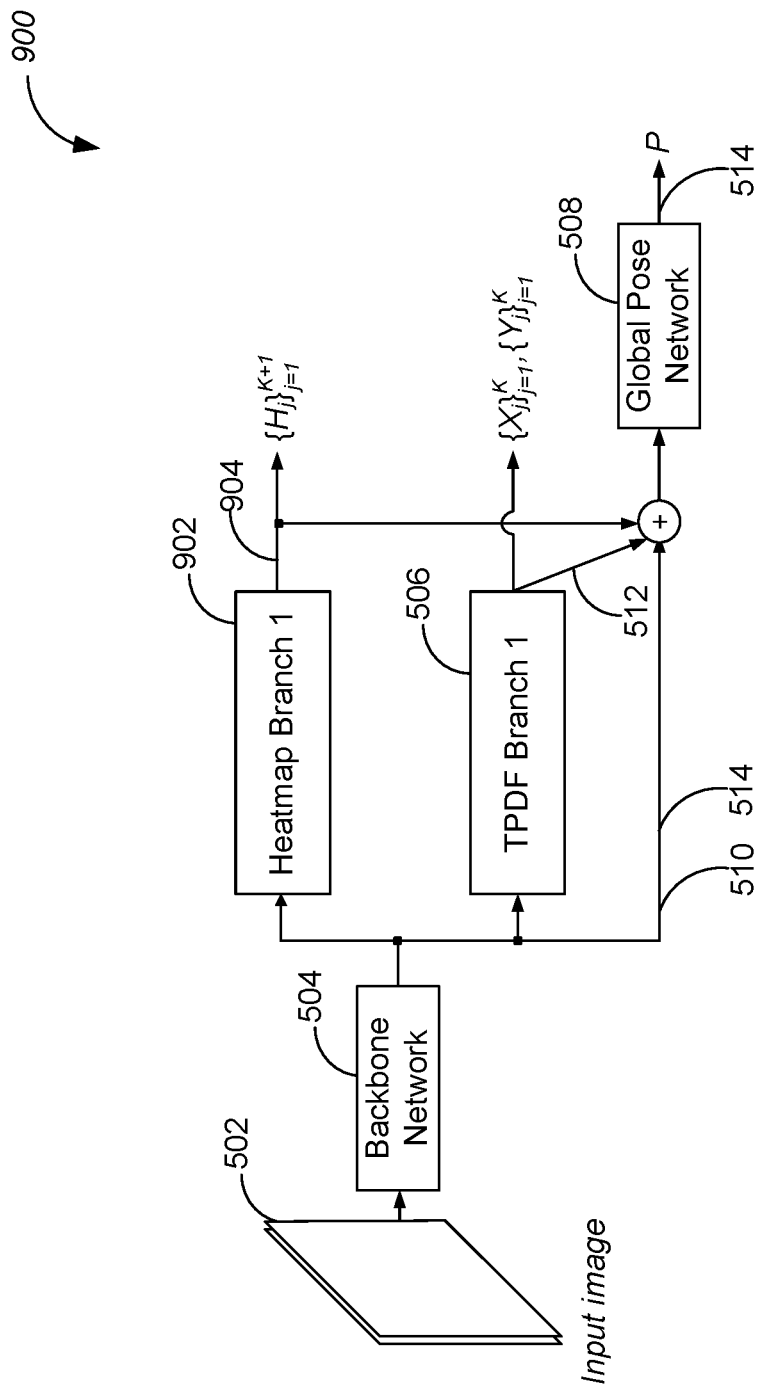
FIGS. 9A and 9B are block diagrams of data processing models and for identifying human poses in an image based on one or more TPDF maps and one or more confidence maps, in accordance with some embodiments.
Figure 9B:
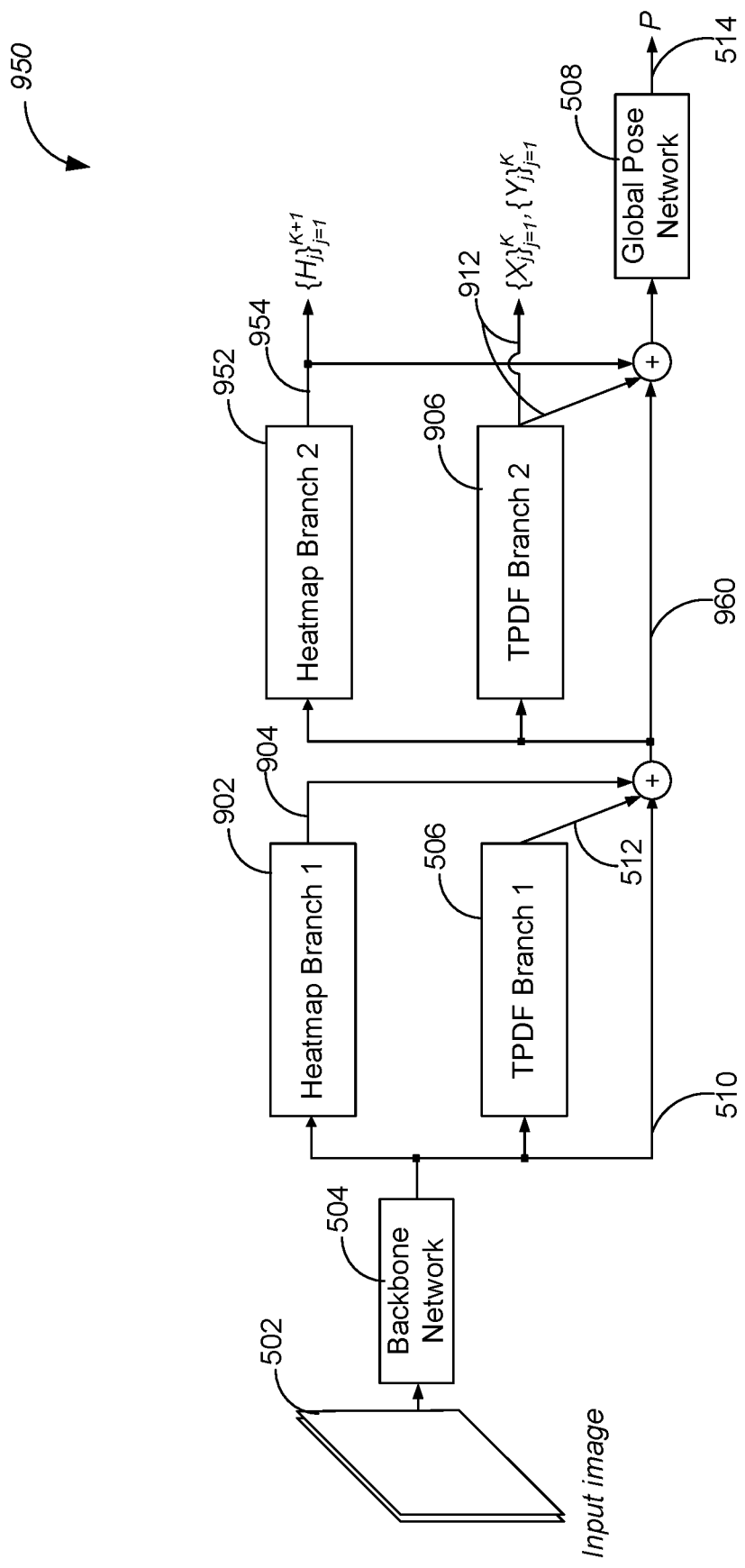

FIGS. 9A and 9B are block diagrams of data processing models 900 and 950 for identifying human poses in an image 502 based on one or more TPDF maps and one or more confidence maps, in accordance with some embodiments. The data processing model 900 has a single stage of a TPDF branch 506 and a heatmap branch 902 that are coupled in parallel with each other. The parallel TPDF and heatmap branches are coupled in series with a backbone network 504 and a global pose network 508. While the TPDF branch 506 converts the feature map 510 to a plurality of first TPDF maps 512 corresponding to a plurality of predefined part types, the heatmap branch 902 converts the feature map 510 into a plurality of first confidence maps 904 $\{H_j\}_{j=1}^{K+1}$. The plurality of first confidence maps 904 including a background confidence map corresponding to a background of the image 502 and a first set of part confidence maps corresponding to the plurality of body parts in the image. Each map in the first set of part confidence maps describes a confidence of a corresponding body part occurring at each discrete location in the image 502. The global pose map 514 is generated based on a combination (e.g., a concatenation) of the feature map 510, the plurality of TPDF maps 512, and the plurality of first confidence maps 904.

Referring to FIG. 9B, in some embodiments, the data processing model 950 includes two serial stages of TPDF and heatmap branches that are further coupled in series between the backbone network 504 and global pose network 508. Each of the two stages includes a TPDF branch and a heatmap branch that are coupled in parallel with each other. That said, a first TPDF branch 506 and a first heatmap branch 902 are coupled in parallel in the first stage, and a second TPDF branch 906 and a second heatmap branch 952 are coupled in parallel in the second stage. The feature map 510, the plurality of first TPDF maps 512, and the plurality of first confidence maps 904 are combined (e.g., concatenated) to generate a combined feature map 960. The second TPDF branch 906 converts the combined feature map 960 to a plurality of second TPDF maps 912. The second heatmap branch 952 converts the combined feature map 960 to a plurality of second confidence maps 954 $\{H_j\}_{j=1}^{K+1}$. The global pose network 508 generates the global pose map 514 from the combined feature map 960, the plurality of second TPDF maps 912, and the plurality of second confidence maps 954 (e.g., based on a concatenation of the maps 960, 912 and 954). In some embodiments, the plurality of second confidence maps 954 including another background confidence map corresponding to the background of the image 502 and a second set of part confidence maps corresponding to the plurality of body parts in the image 502. In some embodiments as shown in FIG. 7, the global pose map 514 and the TPDF maps 912 are used in a fusion process to determine the position ($\hat{x}_j$, $\hat{y}_j$) and depth $\hat{z}_j$ of each body part in the image.

In some embodiments, during a training process, a Gaussian filter is applied to prepare ground-truth part confidence maps $\{H^*_j\}_{j=1}^{K+1}$. In some embodiments, the data processing model 900 or 950 is trained end-to-end via minimizing a total loss $L_2$ that is a sum of a backbone loss $L_B$, a TPDF loss $L_h$, a heatmap loss $L_h$, and a global pose loss $L_p$. The backbone loss $L_B$, TPDF loss $L_h$, heatmap loss $L_h$, and global pose loss $L_p$ are contributed by the backbone network 504, TPDF branch 506 or 906, heatmap branch 902 or 952, and global pose network 508, respectively.

Figure 10A:
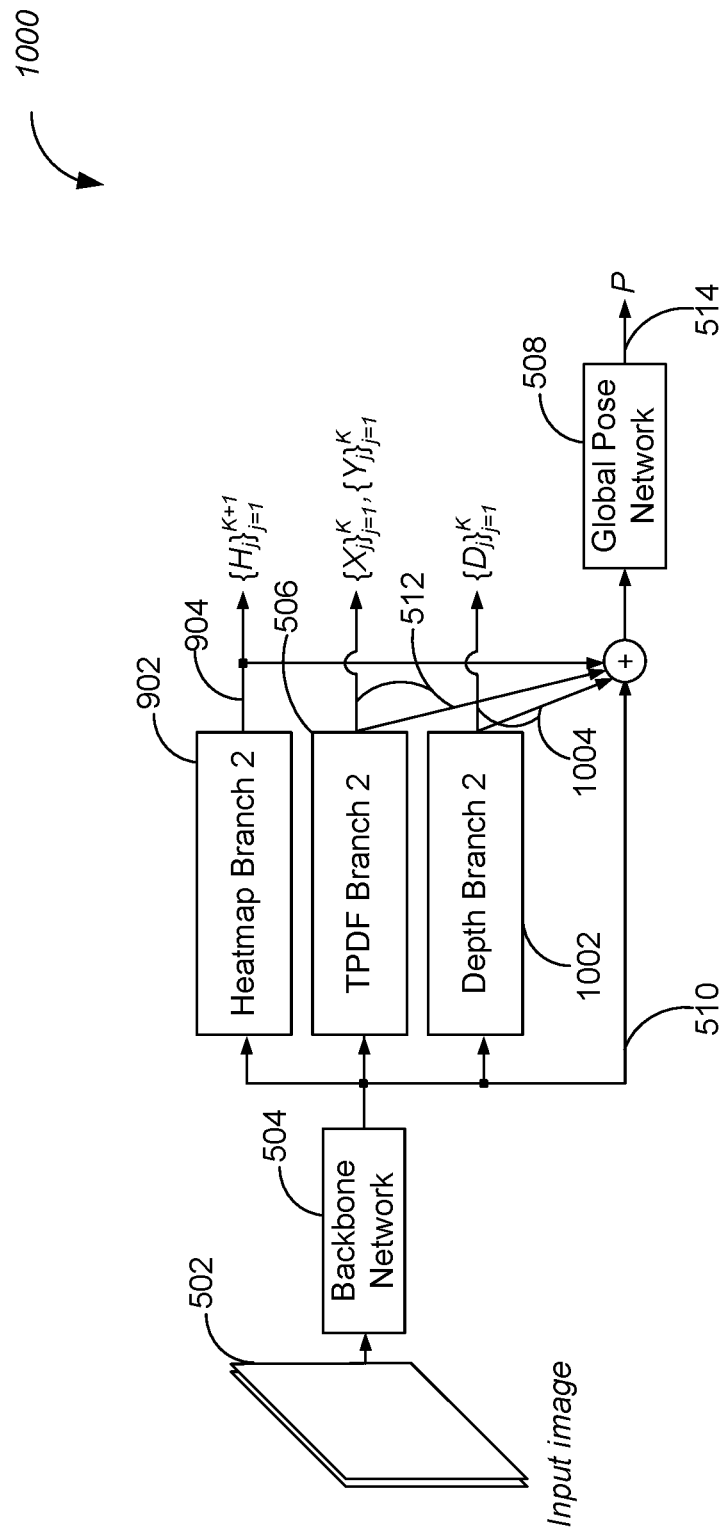
FIGS. 10A and 10B are block diagrams of data processing models for identifying human poses in an image based on one or more TPDF maps, one or more confidence maps, and one or more depth maps, in accordance with some embodiments.
Figure 10B:
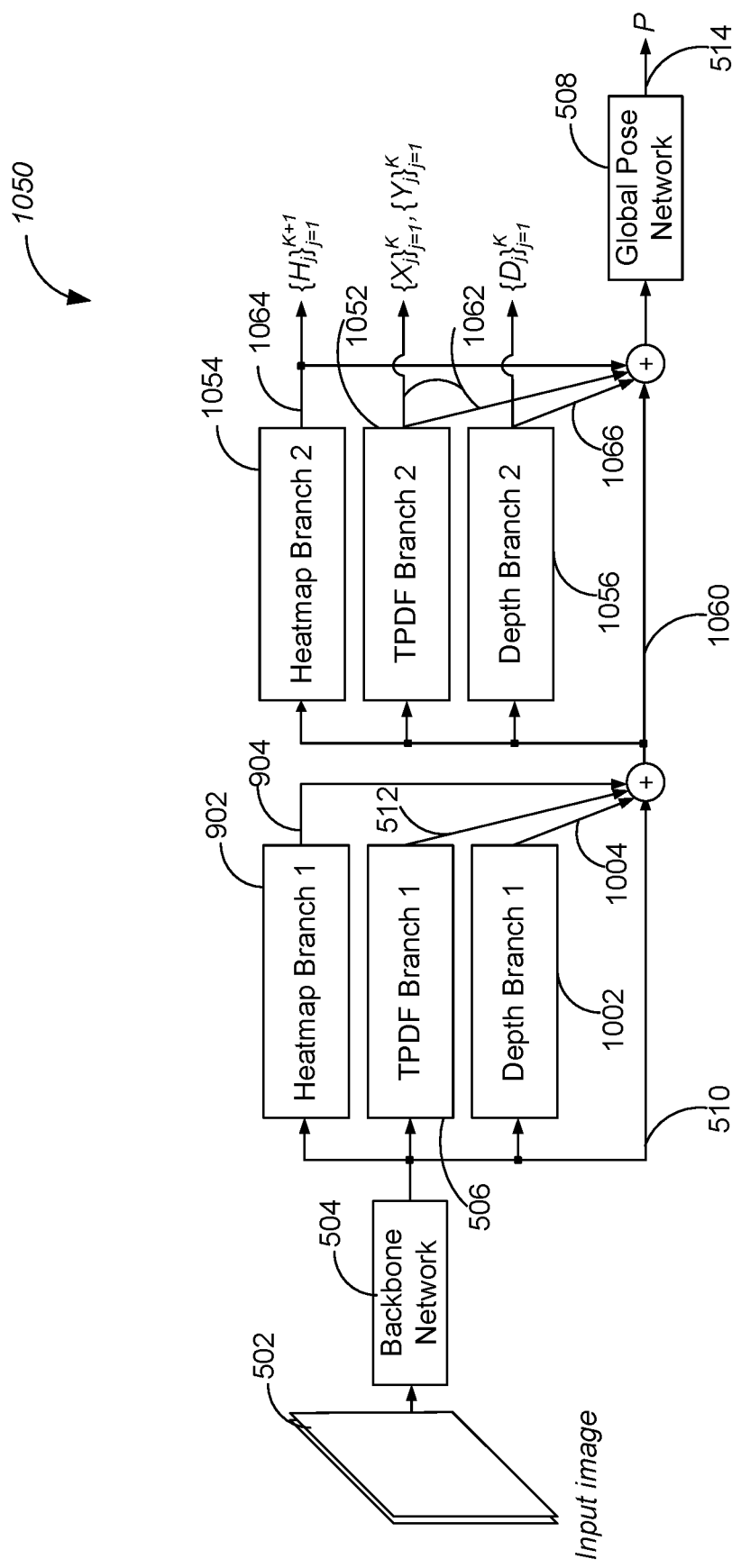

FIGS. 10A and 10B are block diagrams of data processing models 1000 and 1050 for identifying human poses in an image based on one or more TPDF maps, one or more confidence maps, and one or more depth maps, in accordance with some embodiments. The data processing model 900 has a single stage of a TPDF branch 506, a heatmap branch 902, and a depth branch 1002 that are coupled in parallel with each other. The parallel TPDF, heatmap, and depth branches are coupled in series with a backbone network 504 and a global pose network 508. The depth branch 1002 converts the feature map 510 to a plurality of first depth maps 1004 corresponding to a plurality of body parts in the image 502. Each first depth map 1004 corresponds to a respective one of the plurality of body parts. The global pose map 514 is generated based on a combination (e.g., a concatenation) of the feature map 510, the plurality of TPDF maps 512, the plurality of first confidence maps 904, and the plurality of first depth maps 1004 $\{D_j\}_{j=1}^{K}$.

Referring to FIG. 10B, in some embodiments, the data processing model 1050 includes two serial stages of TPDF, heatmap, and depth branches, and the two serial stages are further coupled in series between the backbone network 504 and global pose network 508. Each of the two stages includes a TPDF branch, a heatmap branch, and a depth map that are coupled in parallel with each other. That said, a first TPDF branch 506, a first heatmap branch 902, and a first depth branch 1002 are coupled in parallel in the first stage, and a second TPDF branch 1052, a second heatmap branch 1054, and a second depth branch 1056 are coupled in parallel in the second stage. The feature map 510, the first TPDF maps 512, the first confidence maps 904, and the first depth maps 1004 are combined (e.g., concatenated) to generate a combined feature map 1060. The second TPDF branch 1052 converts the combined feature map 1060 to a plurality of second TPDF maps 1062. The second heatmap branch 1054 converts the combined feature map 1060 to a plurality of second confidence maps 1064 $\{H_j\}_{j=1}^{K+1}$. The second depth branch 1056 converts the combined feature map 1060 to a plurality of second depth maps 1066 $\{D_j\}_{j=1}^{K}$. The global pose network 508 generates the global pose map 514 from the combined feature map 1060, the second TPDF maps 1062, the second confidence maps 1064, and the second depth maps 1066 (e.g., based on a concatenation of the maps 1060-1066). In some embodiments as shown in FIG. 7, the global pose map 514 and the TPDF maps 1062 are used in a fusion process to determine the position $(\hat{x}_j, \hat{y}_j)$ and depth $\hat{z}_j$ of each body part in the image.

In some embodiments, the data processing model 900 or 950 is trained end-to-end via minimizing a total loss L that is a sum of a TPDF loss $L_h$, a heatmap loss $L_h$, a depth loss $L_d$, and a global pose loss $L_p$. The TPDF loss $L_h$, heatmap loss $L_h$, depth loss $L_d$, and global pose loss $L_p$ are contributed by the TPDF branch 506 or 1052, heatmap branch 902 or 1054, depth branch 1002 or 1056, and global pose network 508, respectively. Specifically, the loss function is represented as follows:

$$L = L_h + L_d + L_t + L_p \quad (5)$$

$$L_h = \sum_{s=1}^{S} \sum_{j=1}^{K+1} \|H_j^s - H_j^*\|_2^2 \quad (6)$$

$$L_d = \sum_{s=1}^{S} \sum_{j=1}^{K} W_j^d \cdot \|D_j^s - D_j^*\|_2^2 \quad (7)$$

$$L_t = \sum_{s=1}^{S} \sum_{j=1}^{K} W_j^t \cdot (\|X_j^s - X_j^*\|_2^2 + \|Y_j^s - Y_j^*\|_2^2) \quad (8)$$

$$L_p = W^p \cdot \|P - P^*\|^2 \quad (9)$$

where S indicates the stage of the network (e.g., S=2). More specifically, $H^*_j$, $D^*_j$, $X^*_j$, $Y^*_j$, and $P^*$ are ground-truth maps while $W_j^d$, $W_j^t$, and $W^p$ are point-wise weight maps in the same dimension as the corresponding ground-truth maps. Weight maps are not applied to the heatmap loss as the foreground and background samples are equally important.

In some embodiments, a depth dataset with 3D pose labels is created to train a TPDF-based data processing model (e.g., models 500, 800, 900, 950, 1000, and 1050). The dataset is designed to enable multi-person and background data augmentation such that the pose estimation network is generalized towards uncontrolled real-world multi-person scenarios. The dataset facilitates training models that can be generalized to new background and unobserved multi-person configurations in real-world applications. In this application, the TPDF-based data processing model is configured to implement multi-person processing efficiently and accurately based on at least the depth dataset.

On the depth dataset, a method is trained on the training set which not only provides 3D human poses but also human segments. Given the provided human segments, background augmentation can be applied by superimposing the human mask region from a training image onto a randomly selected background image. Meanwhile, multi-person augmentation can also been applied by superimposing multiple human segments onto a random background scene following a z-buffer rule. In training, each method is trained with multi-person augmentation on top of basic data augmentation. In testing, a method is evaluated on four different datasets representing different levels of challenges: (1) the validation set directly, (2) the background augmented set constructed from validation set, (3) the multi-person augmented set constructed from validation set, and (4) the real testing set including real-world, multi-person recordings.

In some embodiments, an ablation study is implemented for a TPDF-based data processing model to differentiate the contribution from different components. Evaluation has been done separately on: (1) the 2D global poses (e.g., the TPDF maps 1062 and displacement vectors in FIG. 10) predicted from the global pose network, (2) the final 2D poses after fusion (e.g., position $(\hat{x}_j, \hat{y}_j)$ in FIG. 7), (3) the 3D poses computed from 2D fused poses and predicted depth of parts (e.g., the TPDF and depth maps 1062 and 1066 in FIG. 10), and (4) the upper bound of 3D poses computed from ground-truth 2D poses and predicated depth (e.g., depth $\hat{z}_j$ in FIG. 7). The 2D poses after fusion improves direct outputs from the global pose network 508.

Figure 11:
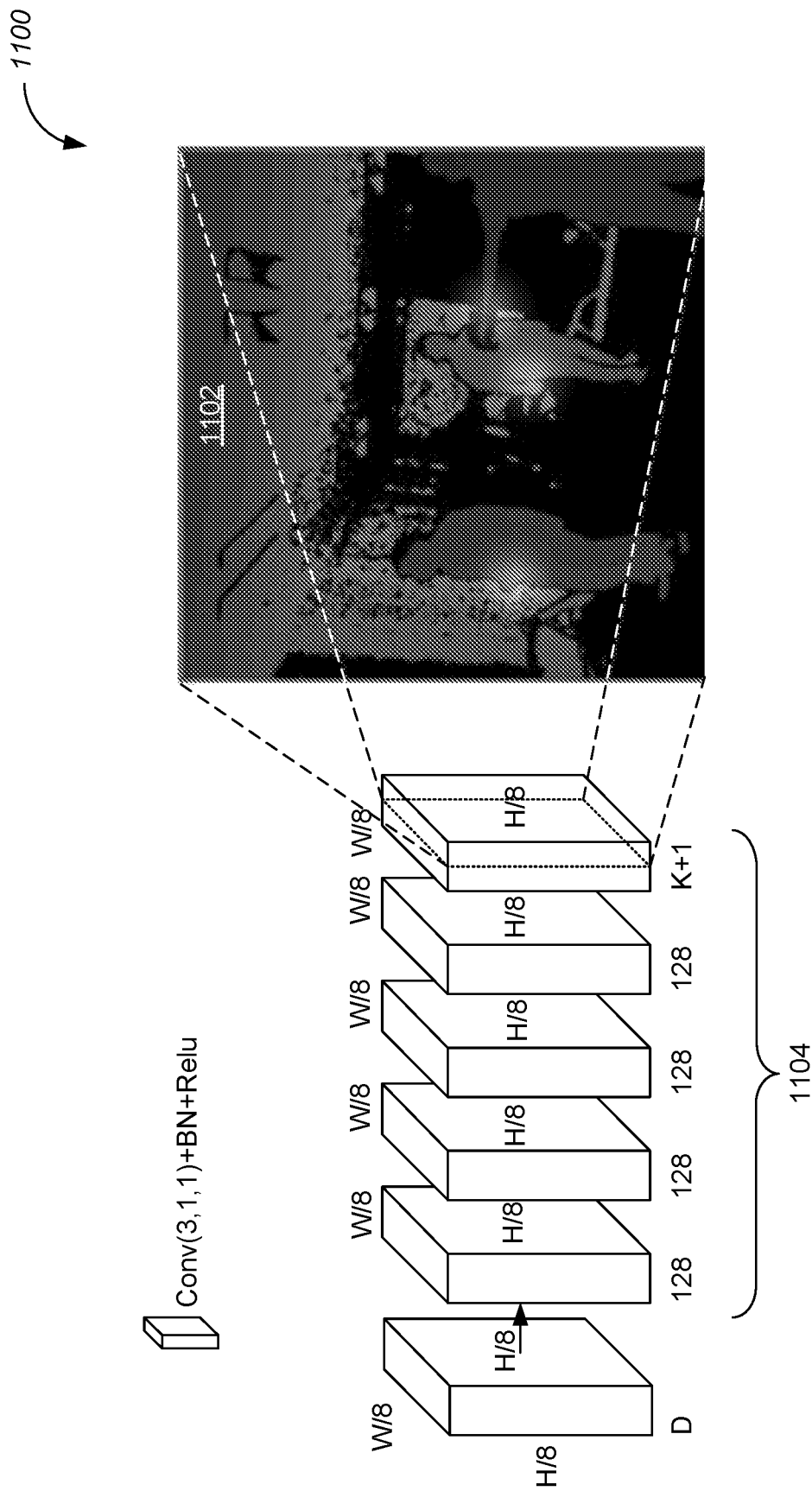
FIG. 11 illustrates a heatmap branch that generates a confidence map, in accordance with some embodiments.

FIG. 11 illustrates a heatmap branch 1100 (e.g., heatmap branches 902, 952 and 1054) that generates a confidence map 1102, in accordance with some embodiments. Each human body includes K distinct body parts. As shown above in FIGS. 9A-9B and 10A-10B, each of the heatmap branches 902, 952 and 1054 is configured to predict K+1 confidence maps 904, 954 or 1064, including K confidence maps corresponding to the K body parts and an additional confidence map corresponding to the background of the image 502. In an example, each heatmap branch 902, 952 or 1054 includes a plurality of 3×3 convolutional layers 1104 (e.g., 5 convolutional layers), and each convolutional layer is followed by a BN layer and a ReLU layer.

Figure 12:
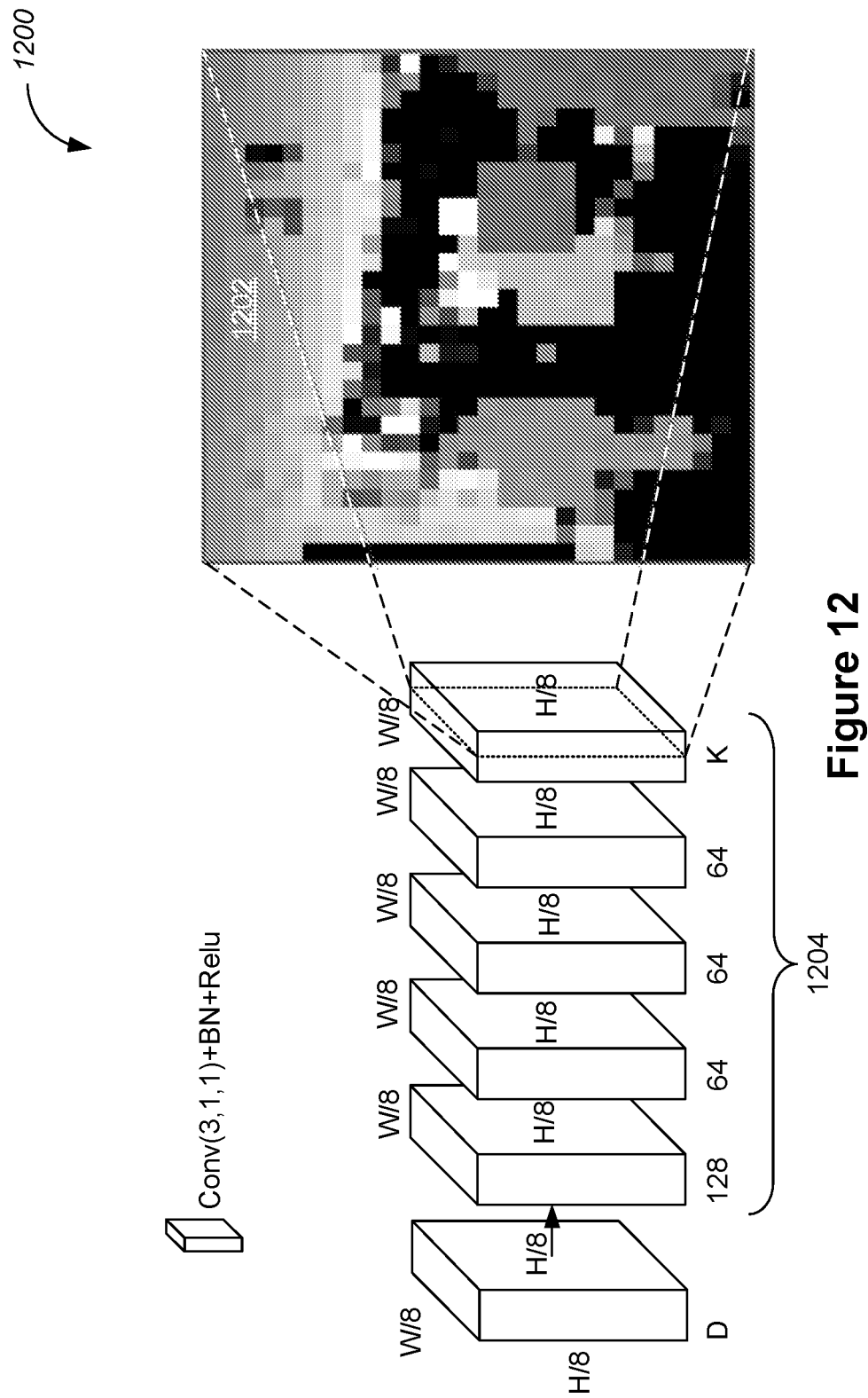
FIG. 12 illustrates a depth branch that generates a depth map visualized on an image, in accordance with some embodiments.

FIG. 12 illustrates a depth branch 1200 (e.g., depth branches 1002 and 1056) that generates a depth map 1202 visualized on an image, in accordance with some embodiments. As shown above in FIGS. 10A and 10B, each of the depth branches 1002 and 1056 is configured to predict K depth maps corresponding to the K body parts in the image 502. In an example, each depth branch 1002 or 1056 includes a plurality of 3×3 convolutional layers 1204 (e.g., 5 convolutional layers), and each convolutional layer is followed by a BN layer and a ReLU layer. In some embodiments, each depth branch 1002 or 1056 predicts a plurality of part-wise depth maps 1004 or 1066. Such depth branches enable a fusion process that relieves effect from raw depth artifacts and recovers the true depth of a part under occlusion. To prepare ground-truth depth maps $\{D^*_j\}_{j=1}^{K}$, each depth map is initialized with a resized raw depth input. Depth values in a 2-pixel-radius disk area centered at each part j are overridden with a ground-truth depth of part j. In a multi-person scenario (i.e., when the image 502 includes more than one person), if a 2D grid position is occupied by masks of more than one part, writing of depth values follows a z-buffer rule in which the smallest depth value is recorded in the 2D grid position. In addition, weight maps $\{W_j\}_{j=1}^{K}$ are prepared in the same dimension as the ground-truth depth maps. In an example, a weight of a foreground grid is set to 0.9, and a weight of a background is set to 0.1.

Figure 13:
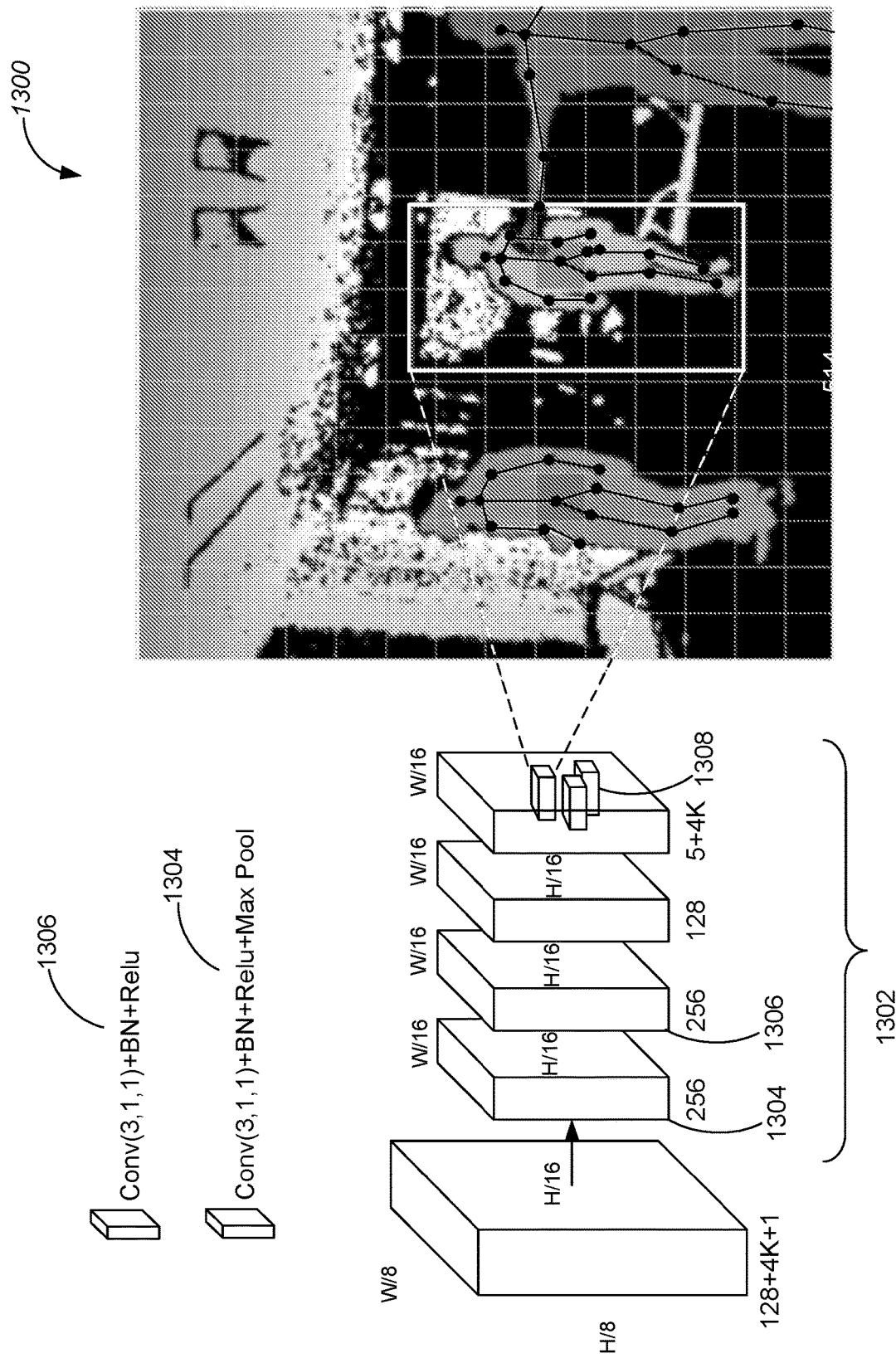
FIG. 13 illustrates a global pose network that generates a global pose map including a set of poses visualized on an image, in accordance with some embodiments.

FIG. 13 illustrates a global pose network 508 that generates a global pose map 514 including a set of poses visualized on an image, in accordance with some embodiments. The global pose network 508 processes concatenated features from the backbone network 504 and a subset of the TPDF, heatmap, and depth branches to predict the global pose map 514. In an example, the global pose network 508 includes four convolutional layers 1302 where a first convolutional layer 1304 is supplemented with a max pooling layer to set the global pose map 514 to a 16× down-sampling level and a second convolutional layer 1306 is not supplemented with any pooling layer. In an example, both the first and second convolutional layers include a BN layer and a ReLU layer. In some embodiments, the global pose network 508 outputs an anchor-based global pose map 514 that is converted to a set of poses based on non-max suppression (NMS).

During a training process, a ground-truth global pose map P* is prepared so that each grid records five bounding box attributes and a set of pose attributes $\{(dx_j^a, dy_j^a, Z_j^a, v_j^a)\}_{j=1}^{K}$ of the ground-truth pose for each associated anchor a 1308. Specifically, $(dx_j^a, dy_j^a)$ indicates 2D offsets of part j from the anchor center of the associated anchor a 1308, $Z_j^a$ indicates the 3D part depth, and $v_j^a$ indicates the visibility of part j. The value of $v_j^a$ is assigned to 1 when the depth from a global pose part $Z_j^a$ is different from the corresponding depth branch ground-truth in $D_j$; otherwise, it is assigned to 0. The weight map $W^P$ is prepared in the same dimension as P*. In some embodiments, for the dimensions corresponding to bounding box probabilities, an example value of 0.9 is applied to the grids associated with the ground truth, while 0.1 is assigned to the rest. For the other dimensions, assignment of weights follows a strict 0 and 1 rule. The weight map is designed in this way because a detection task related to $p_b$ considers both foreground and background data while a regression task to other attributes focuses on foreground data.

Figure 14:
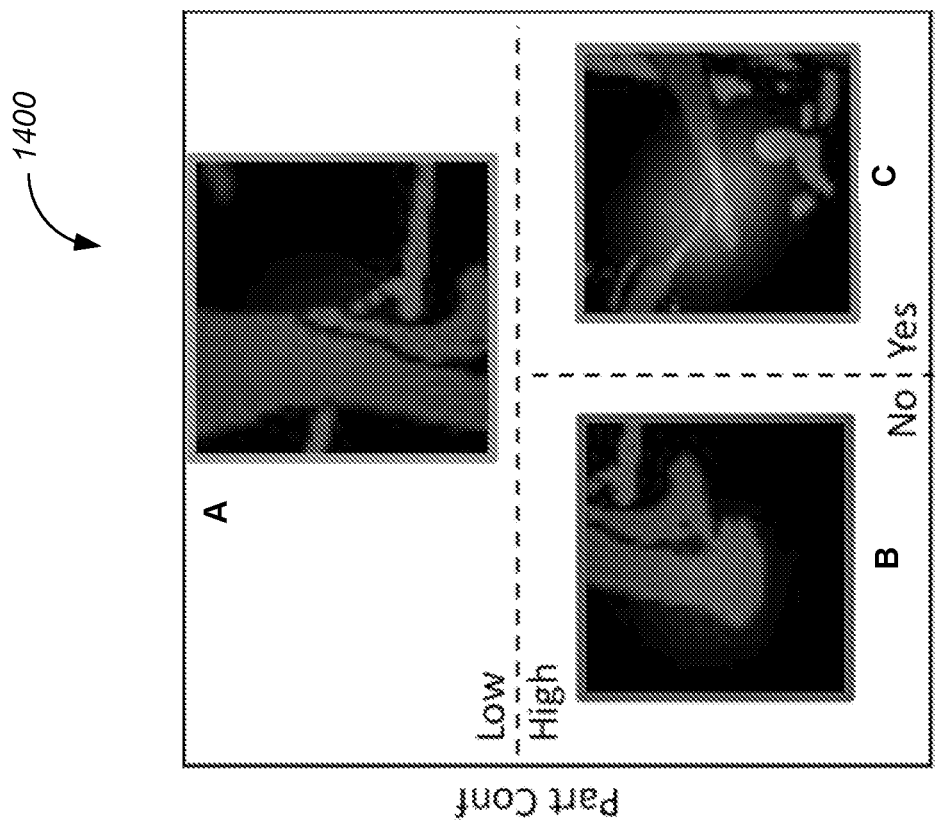
FIG. 14 illustrates an image having three interest areas, in accordance with some embodiments.
Figure 14:
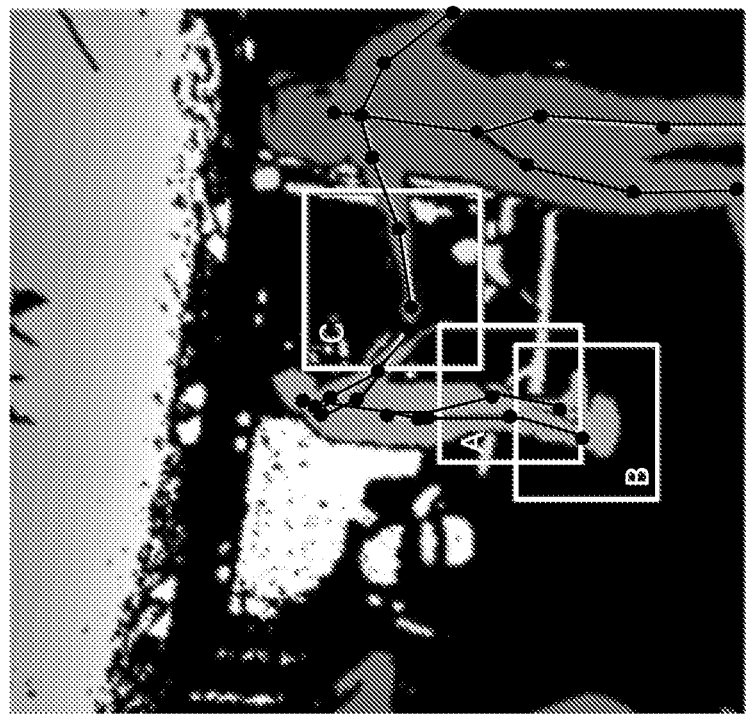

FIG. 14 illustrates an image 1400 having three interest areas A, B and C, in accordance with some embodiments. A mode selection scheme is applied when occlusion occurs. The mode selection scheme relies on confidence maps $\{H_j\}_{j=1}^{K+1}$ and visibility attributes of the plurality of body parts predictable from the global pose network 508. In the interest area A, a part confidence $H_j$ is low (e.g., below a confidence threshold) for a global part position, and the global detection is used directly. The interest area A is observed when the position of a part is not accessible from local information due to truncation and occlusion. In an interest area B, the part confidence $H_j$ is high (e.g., above the confidence threshold), and no occlusion from another body part of the same part type is involved. The fusion process is applied based on a TPDF-based data processing model (e.g., models 500, 800, 900, 950, 1000, and 1050). In an interest area C, the part confidence $H_j$ is high (e.g., above the confidence threshold), and is impacted by occlusion from another body part of the same part type. The interest area C is detected by introducing additional part visibility $\{v_j\}_{j=1}^{K}$ to a global pose representation. Since the depth map 1004 $\{D_j\}_{j=1}^{K}$ is prepared following a z-buffer rule, a significant difference between a global part depth and the part depth map 1004 $\{D_j\}_{j=1}^{K}$ is observed in this case. The part visibility $\{v_j\}_{j=1}^{K}$ can be integrated into the global pose representation and used as the indicator for the interest area C. Stated another way, in this example, the confidence of left knee is low in the interest area A, and the confidence of right foot is high without ambiguity in the interest area B while the confidence of occluded right hand is high but hallucinated by another right hand from another person in the interest area C.

In some embodiments, the image 502 includes two body parts of the same part type (e.g., the two right hands in the interest area C), and the two body parts belong to two distinct human bodies and partially overlap with each other. The global pose network 508 generates a plurality of part visibility maps $\{v_j\}_{j=1}^{K}$ corresponding to the plurality of body parts including the two body parts of the same part type. The global pose map 514 is generated based on the plurality of part visibility maps, thereby indicating occlusion between the two body parts of the same part type. Further, in some situations, the part visibility maps $\{v_j\}_{j=1}^{K}$ are generated to modify the global pose map 514 in accordance with a determination that a part confidence level of each of the two body parts is above a confidence threshold. The part confidence level is optionally determined based on confidence maps 904 or 954 of the two body parts generated by the heatmap branch 902 or 952.

Figure 15:
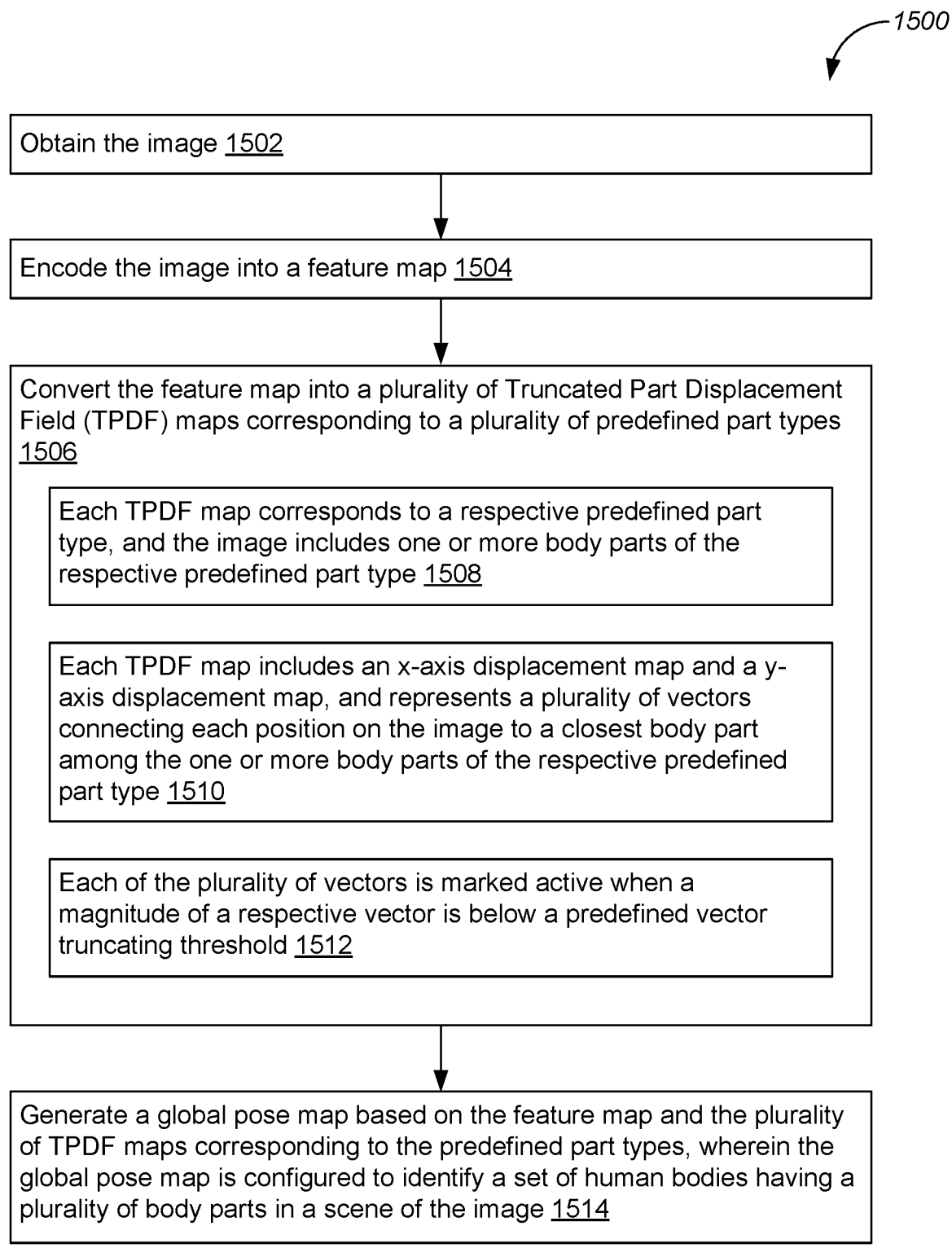
FIG. 15 is a flow chart of a method for identifying human poses in an image, in accordance with some embodiments.

FIG. 15 is a flow chart of a method 1500 for identifying human poses in an image, in accordance with some embodiments. For convenience, the method 1500 is described as being implemented by a computer system (e.g., a client device 104, a server 102, or a combination thereof). An example of the client device 104 is a mobile phone. Method 1500 is, optionally, governed by instructions that are stored in a non-transitory computer readable storage medium and that are executed by one or more processors of the computer system. Each of the operations shown in FIG. 15 may correspond to instructions stored in a computer memory or non-transitory computer readable storage medium (e.g., memory 206 of the system 200 in FIG. 2). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1500 may be combined and/or the order of some operations may be changed.

The computer system obtains (1502) an image 502 and encodes (1504) the image 502 into a feature map 510, e.g., using a backbone network 504. In some embodiments, the image 502 includes at least one of an RGB image and a depth image. The feature map 510 is converted (1506) into a plurality of TPDF maps 512 corresponding to a plurality of predefined part types, e.g., using a TPDF branch 506. Each TPDF map 512 corresponds to (1508) a respective predefined part type, and the image 502 includes one or more body parts of the respective predefined part type. Each TPDF map 512 includes (1510) an x-axis displacement map 512A and a y-axis displacement map 512B, and represents a plurality of vectors connecting each position on the image to a closest body part among the one or more body parts of the respective predefined part type. Each of the plurality of vectors is marked (1512) active when a magnitude of a respective vector is below a predefined vector truncating threshold. The computer system generates (1514) a global pose map 514 based on the feature map and the plurality of TPDF maps corresponding to the predefined part types, e.g., using a global pose network 508. The global pose map is configured to identify one or more human bodies having a plurality of body parts in a scene of the image 502. In some embodiments, the global pose map 514 is generated using a global pose network 508, and the global pose network 508 includes a plurality of 3×3 convolutional layers and a max-pooling layer.

In some embodiments, the global pose map 512 includes a position of each body part. The feature map 510 is converted into a plurality of confidence maps (e.g., 904 and 954 in FIGS. 9A and 9B) corresponding to the plurality of body parts in the image 502. Each confidence map includes a confidence level of a respective body part in each position on the image 502. For each of the plurality of body parts, an average position is generated by aggregating the x-axis and y-axis displacement maps of the TPDF map based on the confidence map, respectively, and adjusting the position of each body part in the global pose map 514 to generate the average position of the respective body part based on the aggregation of the TPDF map. Further, in some embodiments, for one of the plurality of body parts, it is determined that a corresponding confidence map corresponds to a confidence level less than a confidence level threshold. In accordance with such a determination, adjusting the position of the one of the plurality of body parts is aborted, such that the position of the one of the plurality of body parts is approximately equal to the average position of the respective part type. Average positions of the plurality of body parts define one or more 2D poses of the one or more human bodies in the image.

Additionally, in some embodiments, the feature map is converted into a plurality of depth maps (e.g., 1002 and 1066 in FIGS. 10A and 10B) corresponding to the plurality of body parts in the image 502. Each depth map includes depth information of a respective body part in each position on the image 502. For each of the plurality of body parts, an average depth is generated by aggregating the depth information of the respective depth map based on the confidence map. Average depths of the plurality of body parts, jointly with the corresponding average positions, define one or more 3D poses of the one or more human bodies in the image. More details on pose position adjustment are explained above with reference to FIG. 7.

In some embodiments, the plurality of TPDF maps includes a plurality of first TPDF maps 512. To generate the global pose map 514, the feature map 510 is combined (e.g., concatenated) with the plurality of first TPDF maps 512 to generate a combined feature map 810. The combined feature map 810 is converted to a plurality of second TPDF maps 712, e.g., by a second TPDF branch 806. The global pose map 514 is generated from the combined feature map 810 and the plurality of second TPDF maps 812. Further, in some embodiments, each second TPDF map 812 corresponds to a respective predefined part type. Each second TPDF map 812 includes a second x-axis displacement map and a second y-axis displacement map, and represents a plurality of second vectors connecting each position on the image 502 to a closest body part among the one or more body parts of the respective predefined part type. Each of the plurality of second vectors is marked active when a magnitude of a respective second vector is below the predefined vector truncating threshold. More details on TPDF-based data processing are explained above with reference to FIGS. 5, 6, and 8.

In some embodiments, the feature map 510 is converted into a plurality of confidence maps 904. The plurality of confidence maps 904 includes a background confidence map corresponding to a background of the image 502 and a first set of part confidence maps corresponding to the plurality of body parts. The global pose map is generated based on a combination (e.g., concatenation) of the feature map 510, the plurality of TPDF maps 512, and the plurality of confidence maps 904. Further, in some embodiments, the plurality of TPDF maps includes a plurality of first TPDF maps 512, and the plurality of confidence maps includes a plurality of first confidence maps 904. To generate the global pose map, the feature map 510, the plurality of first TPDF maps 512, and the plurality of first confidence maps 904 to generate a combined feature map 960, which is further converted to a plurality of second TPDF maps 912 and a plurality of second confidence maps 954. The global pose map 514 is converted from the combined feature map 960, the plurality of second TPDF maps 912, and the plurality of second confidence maps 954. More details on confidence-based data processing are explained above with reference to FIGS. 9A and 9B.

Additionally, in some embodiments, the feature map 510) is converted to into a plurality of depth maps 1004, e.g., using a depth branch 1002. Each depth map 1004 corresponds to a respective body part. The global pose map 514 is generated based on a combination (e.g., concatenation) of the feature map 510, the plurality of TPDF maps 512, the plurality of confidence maps 904, and the plurality of depth maps 1004. Further, in some embodiments, the plurality of TPDF maps includes a plurality of first TPDF maps 512. The plurality of confidence maps includes a plurality of first confidence maps 904. The plurality of depth maps includes a plurality of first depth maps 1004. To generate the global pose map 514, the feature map 510, the plurality of first TPDF maps 512, the plurality of first confidence maps 904, and the plurality of first depth maps 1004 are combined into a combined feature map 1060. The combined feature map 1060 is converted to a plurality of second TPDF maps 1062, a plurality of second confidence maps 1064, and a plurality of second depth maps 1066. The global pose map 514 is generated from the combined feature map 1060, second TPDF maps 1062, second confidence maps 1064, and second depth maps 1066. More details on depth-based data processing are explained above with reference to FIGS. 10A and 10B.

In some embodiments, the plurality of body parts includes a first number (K) of body parts. The plurality of TPDF maps 512 or 812 includes a second number (2K) of TPDF maps. The plurality of confidence maps 904, 954, or 1062 includes a third number (K+1) of confidence maps. The plurality of depth maps 904 or 1066 includes the first number (K) of depth maps. In some embodiments, the image 502 is encoded to the feature map 510 using a backbone network 504. The confidence, TPDF, and depth maps are generated using a heatmap model, a TPDF model, and a depth model, respectively. The global pose map 512 is generated using a global pose network 504. The backbone network, heatmap model, TPDF model, depth model, and global pose network are trained end-to-end based on a total loss combining a heatmap loss, a TPDF loss, a depth loss, and a global pose loss.

In some embodiments, the image 502 includes two body parts of the same part type, and the two body parts belong to two distinct human bodies and partially overlap with each other. A plurality of part visibility maps is generated and corresponds to the plurality of body parts including the two body parts of the same part type, wherein the global pose map is generated based on the plurality of part visibility maps, thereby indicating occlusion between the two body parts of the same part type.

It should be understood that the particular order in which the operations in FIG. 15 have been described are merely exemplary and are not intended to indicate that the described order is the only order in which the operations could be performed. One of ordinary skill in the art would recognize various ways to identify human poses as described herein. Additionally, it should be noted that details of other processes described above with respect to FIGS. 5-14 are also applicable in an analogous manner to method 1500 described above with respect to FIG. 15. For brevity, these details are not repeated here.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising." when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for identifying human poses in an image, comprising:
    obtaining the image;
    encoding the image into a feature map;
    converting the feature map into a plurality of Truncated Part Displacement Field (TPDF) maps corresponding to a plurality of predefined part types, where:
        each TPDF map corresponds to a respective predefined part type, and the image comprises one or more body parts of the respective predefined part type;
        each TPDF map comprises an x-axis displacement map and a y-axis displacement map, and represents a plurality of vectors connecting each position on the image to a closest body part among the one or more body parts of the respective predefined part type; and
        each of the plurality of vectors is marked active when a magnitude of a respective vector is below a predefined vector truncating threshold; and
    generating a global pose map based on the feature map and the plurality of TPDF maps corresponding to the predefined part types, wherein the global pose map is configured to identify one or more human bodies having a plurality of body parts in a scene of the image.

2. The method of claim 1, wherein the global pose map comprises a position of each body part, the method further comprising:
    converting the feature map into a plurality of confidence maps corresponding to the plurality of body parts in the image, each confidence map comprising a confidence level of a respective body part in each position on the image;
    for each of the plurality of body parts, generating an average position, comprising:
        aggregating the x-axis and y-axis displacement maps of the TPDF map based on the confidence map, respectively;
        based on the aggregation of the TPDF map, adjusting the position of each body part in the global pose map to generate the average position of the respective body part.

3. The method of claim 2, further comprising for one of the plurality of body parts:

determining that a corresponding confidence map corresponds to a confidence level less than a confidence level threshold; and aborting adjusting the position of the one of the plurality of body parts, such that the position of the one of the plurality of body parts is approximately equal to the average position of the respective part type.

4. The method of claim 2, further comprising:
converting the feature map into a plurality of depth maps corresponding to the plurality of body parts in the image, each depth map comprising depth information of a respective body part in each position on the image;
for each of the plurality of body parts, generating an average depth by aggregating the depth information of the respective depth map based on the confidence map.

5. The method of claim 1, wherein the plurality of TPDF maps comprises a plurality of first TPDF maps, and generating the global pose map further comprises:
combining the feature map with the plurality of first TPDF maps to generate a combined feature map;
converting the combined feature map to a plurality of second TPDF maps; and
generating the global pose map from the combined feature map and the plurality of second TPDF maps.

6. The method of claim 5, wherein:
each second TPDF map corresponds to a respective predefined part type;
each second TPDF map comprises a second x-axis displacement map and a second y-axis displacement map, and represents a plurality of second vectors connecting each position on the image to a closest body part among the one or more body parts of the respective predefined part type; and
each of the plurality of second vectors is marked active when a magnitude of a respective second vector is below the predefined vector truncating threshold.

7. The method of claim 1, further comprising:
converting the feature map into a plurality of confidence maps, the plurality of confidence maps comprising a background confidence map corresponding to a background of the image and a first set of part confidence maps corresponding to the plurality of body parts;
wherein the global pose map is generated based on a combination of the feature map, the plurality of TPDF maps, and the plurality of confidence maps.

8. The method of claim 7, wherein the plurality of TPDF maps comprises a plurality of first TPDF maps, and the plurality of confidence maps comprises a plurality of first confidence maps, and wherein generating the global pose map further comprises:
combining the feature map, the plurality of first TPDF maps, and the plurality of first confidence maps to generate a combined feature map;
converting the combined feature map to a plurality of second TPDF maps;
converting the combined feature map to a plurality of second confidence maps; and
generating the global pose map from the combined feature map, the plurality of second TPDF maps, and the plurality of second confidence maps.

9. The method of claim 7, further comprising:
converting the feature map to into a plurality of depth maps, each depth map corresponding to a respective body part; and wherein the global pose map is generated based on a combination of the feature map, the plurality of TPDF maps, the plurality of confidence maps, and the plurality of depth maps.

10. The method of claim 9, wherein:
the plurality of TPDF maps comprises a plurality of first TPDF maps;
the plurality of confidence maps comprises a plurality of first confidence maps;
the plurality of depth maps comprises a plurality of first depth maps; and
generating the global pose map further comprises:
combining the feature map, the plurality of first TPDF maps, the plurality of first confidence maps, and the plurality of first depth maps to generate a combined feature map;
converting the combined feature map to a plurality of second TPDF maps;
converting the combined feature map to a plurality of second confidence maps;
converting the combined feature map to a plurality of second depth maps; and
generating the global pose map from the combined feature map, the plurality of second TPDF maps, the plurality of second confidence maps, and the plurality of second depth maps.

11. The method of claim 10, wherein:
the plurality of body parts comprises a first number (K) of body parts;
the plurality of TPDF maps comprises a second number (2K) of TPDF maps;
the plurality of confidence maps comprises a third number (K+1) of confidence maps; and
the plurality of depth maps comprises the first number (K) of depth maps.

12. The method of claim 10, wherein:
the image is encoded to the feature map using a backbone network;
the confidence, TPDF, and depth maps are generated using a heatmap model, a TPDF model, and a depth model, respectively;
the global pose map is generated using a global pose network; and
the backbone network, heatmap model, TPDF model, depth model, and global pose network are trained end-to-end based on a total loss combining a heatmap loss, a TPDF loss, a depth loss, and a global pose loss.

13. The method of claim 1, wherein the image comprises at least one of an RGB image and a depth image.

14. The method of claim 1, wherein the image comprises two body parts of the same part type, and the two body parts belong to two distinct human bodies and partially overlap with each other.

15. The method of claim 14, further comprising:
generating a plurality of part visibility maps corresponding to the plurality of body parts comprising the two body parts of the same part type, wherein the global pose map is generated based on the plurality of part visibility maps, thereby indicating occlusion between the two body parts of the same part type.

16. The method of claim 1, wherein the global pose map is generated using a global pose network, and the global pose map is generated using a global pose network, and the global pose network comprises a plurality of 3×3 convolutional layers and a max-pooling layer.

17. A computer system, comprising:
one or more processors; and memory having instructions stored thereon, which when executed by the one or more processors cause the processors to perform a method for identifying human poses in an image;
wherein the method comprises:
obtaining the image;
encoding the image into a feature map;
converting the feature map into a plurality of Truncated Part Displacement Field (TPDF) maps corresponding to a plurality of predefined part types, where:
each TPDF map corresponds to a respective predefined part type, and the image comprises one or more body parts of the respective predefined part type;
each TPDF map comprises an x-axis displacement map and a y-axis displacement map, and represents a plurality of vectors connecting each position on the image to a closest body part among the one or more body parts of the respective predefined part type; and
each of the plurality of vectors is marked active when a magnitude of a respective vector is below a predefined vector truncating threshold; and
generating a global pose map based on the feature map and the plurality of TPDF maps corresponding to the predefined part types, wherein the global pose map is configured to identify one or more human bodies having a plurality of body parts in a scene of the image.

18. A non-transitory computer-readable medium, having instructions stored thereon, which when executed by one or more processors cause the processors to perform a method for identifying human poses in an image;
wherein the method comprises:
obtaining the image;
encoding the image into a feature map;
converting the feature map into a plurality of Truncated Part Displacement Field (TPDF) maps corresponding to a plurality of predefined part types, where:
each TPDF map corresponds to a respective predefined part type, and the image comprises one or more body parts of the respective predefined part type;
each TPDF map comprises an x-axis displacement map and a y-axis displacement map, and represents a plurality of vectors connecting each position on the image to a closest body part among the one or more body parts of the respective predefined part type; and
each of the plurality of vectors is marked active when a magnitude of a respective vector is below a predefined vector truncating threshold; and
generating a global pose map based on the feature map and the plurality of TPDF maps corresponding to the predefined part types, wherein the global pose map is configured to identify one or more human bodies having a plurality of body parts in a scene of the image.

19. The computer system of claim 17, wherein the global pose map comprises a position of each body part, the method further comprising:
converting the feature map into a plurality of confidence maps corresponding to the plurality of body parts in the image, each confidence map comprising a confidence level of a respective body part in each position on the image;
for each of the plurality of body parts, generating an average position, comprising:
aggregating the x-axis and y-axis displacement maps of the TPDF map based on the confidence map, respectively;
based on the aggregation of the TPDF map, adjusting the position of each body part in the global pose map to generate the average position of the respective body part.

20. The computer system of claim 17, wherein the plurality of TPDF maps comprises a plurality of first TPDF maps, and generating the global pose map further comprises:
combining the feature map with the plurality of first TPDF maps to generate a combined feature map;
converting the combined feature map to a plurality of second TPDF maps; and
generating the global pose map from the combined feature map and the plurality of second TPDF maps.

* * * * *